United States Patent
Edwards et al.

(10) Patent No.: US 6,650,748 B1
(45) Date of Patent: Nov. 18, 2003

(54) MULTIPLE CALL HANDLING IN A CALL CENTER

(75) Inventors: Thomas J. Edwards, Seattle, WA (US); Norman J. Donaghue, Jr., Renton, WA (US); Denny Y. Fung, Kirkland, WA (US); Steven J. Goldsmith, Bellevue, WA (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/060,038

(22) Filed: Apr. 13, 1998

(51) Int. Cl.[7] .............................................. H04M 3/00
(52) U.S. Cl. .......................... 379/266.04; 379/266.01; 379/265.01
(58) Field of Search ....................... 379/209.01, 212.01, 379/265.01–266.1, 309

(56) References Cited

U.S. PATENT DOCUMENTS

| | | | | |
|---|---|---|---|---|
| 4,163,124 A | * | 7/1979 | Jolissaint | 379/266.01 |
| 4,737,983 A | | 4/1988 | Frauenthal et al. | 379/221 |
| 4,797,911 A | | 1/1989 | Szlam et al. | 379/88.22 |
| 4,894,857 A | | 1/1990 | Szlam et al. | 379/67.1 |
| 5,278,898 A | | 1/1994 | Cambray et al. | 379/266.1 |
| 5,335,268 A | | 8/1994 | Kelly, Jr. et al. | 379/112 |
| 5,530,744 A | | 6/1996 | Charalambous et al. | 379/265 |
| 5,546,452 A | | 8/1996 | Andrews et al. | 379/219 |
| 5,592,542 A | | 1/1997 | Honda et al. | 379/266.05 |
| 5,703,943 A | | 12/1997 | Otto | 379/265.11 |

(List continued on next page.)

FOREIGN PATENT DOCUMENTS

| | | |
|---|---|---|
| EP | 0 772 335 A2 | 5/1997 |
| GB | 2290192 A | 12/1995 |

OTHER PUBLICATIONS

GEOTEL Communications Corporation Web site printout entitled "Intelligent CallRouter Call Flow", 1998.

(List continued on next page.)

*Primary Examiner*—Ahmad F. Matar
*Assistant Examiner*—Hector Agdeppa
(74) *Attorney, Agent, or Firm*—Sheridan Ross P.C.

(57) ABSTRACT

The invention provides a method and system for indefinitely queuing telephone calls in a call center independent of the telephone instrument deployed in the call center. The system includes a plurality of call center telephones, an Automatic Call Distributor (ACD) connected to the call center agent telephones and a Computer-Telephony Integration (CTI) link connected with a multi-call handling (MCH) server having multiple call handling (MCH) application and a data repository. Call center technicians create a first new route point and a second new route point in the ACD using the ACD's configuration program. A client application running on the MCH server monitors telephone calls to the plurality of call center agent telephones through the CTI link. In response to a command from the client application of a call queue request for a call on a particular agent telephone, the MCH application running on the MCH server creates an index for the call, sets a timer for a duration less than the default call timeout period for the ACD, and directs the ACD to transfer the call in the first new route point. Prior to expiration of the default timeout period, the MCH application directs the ACD to transfer the call to the second new route point. The data repository retains the index for each call processed by the MCH application. Storing the unique index for each call allows the MCH application to keep track of each call and enable the MCH application to retrieve a particular call, providing the agent with the ability to selectively retrieve or discard parked calls. The invention is also applicable to robotic call servicing applications that need to park calls and retrieve them. In such embodiments, the MCH application receives instructions from the robotic application rather than the client application.

112 Claims, 11 Drawing Sheets

U.S. PATENT DOCUMENTS

| | | | | |
|---|---|---|---|---|
| 5,757,904 A | * | 5/1998 | Anderson | 345/708 |
| 5,825,869 A | | 10/1998 | Brooks et al. | 379/265.12 |
| 5,915,012 A | | 6/1999 | Miloslavsky | 379/265.02 |
| 5,960,073 A | * | 9/1999 | Kikinis et al. | 370/352 |
| 5,963,635 A | | 10/1999 | Szlam et al. | 379/309 |
| 5,991,392 A | * | 11/1999 | Miloslavsky | 379/211.02 |
| 6,038,293 A | * | 3/2000 | McNerney et al. | 379/207.15 |
| 6,044,144 A | * | 3/2000 | Becker et al. | 379/134 |
| 6,233,333 B1 | * | 5/2001 | Dezonmo | 379/265.02 |

OTHER PUBLICATIONS

GEOTEL Communications Corporation Web site Printout entitled "The Intelligent CallRouter Product Overview", Jul. 3, 1997.

GEOTEL Communications Corporation Web site printout entitled "Intelligent CallRouter Product Architecture" Jul. 3, 1997.

* cited by examiner

| CALLER NAME | PARK TIME | PARK DURATION |
|---|---|---|
| JONES - BETTY'S COOKIES | 09:40:00 | 00:00:00 |
| SPOUSE | 09:39:00 | 00:01:00 |
| SMITH - AM. RECORDS | 09:38:00 | 00:02:00 |
| IRATE - CLIENT UNKNOWN | 09:31:50 | 00:08:10 |
| JEFFERSON - BETTY'S COOKIES | 09:31:45 | 00:08:15 |
| WALTER - YE OLDE LOCKSMITH | 09:30:15 | 00:09:45 |

FIG. 7

MULTIPLE CALL HANDLING IN A CALL CENTER

TECHNICAL FIELD

The invention relates generally to telephone call centers and more particularly to providing call center agents with the ability to handle multiple calls independent of the type of telephone set deployed at their workstations and to provide applications external to an automatic call distributor with the ability to queue calls without a practical limit on the number of calls queued.

BACKGROUND OF THE INVENTION

A typical call center includes a number of agents who field inbound telephone calls and place outbound telephone calls. The agent may place outbound sales calls or field inbound calls (such as 800 numbers) from potential customers. The agents are organized into groups, known as Skill/Split Hunt Groups.

A conventional call center typically comprises either an Automatic Call Distributor (ACD) or Personal Branch Exchange (PBX) which receives incoming calls through a Public Switched Telephone Network (PSTN) and routes the calls to a group of ACD agents having like skills, also known as an ACD Skill/Split Hunt Group, rather than to a specific agent. An ACD typically contains a superset of the functions provided by a PBX. Specialized telephones, known as ACD/PBX feature phones, interface with a specific manufacturer's ACD/PBX and provide the agents with an array of advanced telephony functions. ACD/PBX feature phones typically have configurable buttons for handling multiple calls. ACD/PBX feature phones often provide agents with the ability to handle multiple calls on a single telephone line, known as "multiple call appearances." ACD/PBX feature phones may also provide agents with the ability to handle calls from multiple telephone lines on a single telephone instrument, known as "multiple line appearances." Generally, if an agent only requires the ability to juggle multiple calls, he will have multiple call appearance buttons on his ACD/PBX feature phone. If the agent requires different phone lines for different business functions, then the agent will have on his ACD/PBX feature phone. An ACD/PBX feature phone may provide functions for both multiple call and line appearances.

In recent years, call center telephony has begun moving from proprietary ACD/PBX feature phones designed for a specific ACD/PBX to software-controlled telephony applications (Softphones) that can either co-exist with a proprietary ACD/PBX feature phone or can utilize telephone sets not necessarily designed for any particular ACD/PBX. A call center equipped with ACD/PBX proprietary feature phones typically costs three to four times as much as a call center equipped with Softphones associated with a non-proprietary phone. A conventional ACD/PBX call center requires not only a proprietary ACD/PBX feature phone, but also requires ACD/PBX interface line cards utilizing a proprietary protocol. Softphones provide a less expensive means for attaining many of the capabilities of an ACD/PBX feature phone while using only software in combination with a "plain-old-telephone set" (POTS) and an associated and less expensive line card. A Softphone call center equipped with POTSs is considerably less expensive to establish and to maintain with the latest upgrades than a call center configured with ACD/PBX feature phones. A Softphone has the added advantage that persons who are not permanent call center agents may be provisioned with call center telephone capabilities without the need for an expensive upgrade to an ACD/PBX feature phone. This feature may be especially attractive for seasonal businesses. Additionally, if a business replaces its ACD/PBX for a different manufacturer's model, it is likely that this business can retain their Softphone applications without modification.

The software-controlled application that drives a Softphone call center generally provides the agent with a graphical user interface (GUI) that replaces the function control buttons on an ACD/PBX feature phone used by the agent to control telephony functions. While interacting with a caller over the Softphone, the agent uses hot keys or an electronic mouse to select telephony functions on a workstation screen. A hot key is a keystroke or combination of keystrokes that sends a command to the computing system that provides the Softphone capability. Softphone telephony features emulate the feature buttons on an ACD/PBX feature phone and are supported via a Computer-Telephony Integration (CTI) link to the ACD or PBX. The CTI link allows the Softphone system to control telephone call handling operations in the ACD/PBX such as answering a call, making a call, transferring a call, and making a conference call, by sending requests and receiving event messages over the CTI link. An event message is an action or occurrence to which the Softphone may respond. Software client/server CTI Middleware products interface to the ACD/PBX proprietary CTI link and simplify the application programming interface (API) needed by the Softphone to communicate with the ACD/PBX.

FIG. 1 illustrates a conventional Softphone-configured call center. In this Softphone call center, an ACD 102 interfaces between client telephone calls 100 and agents 108a at an agent workstation 108. The clients typically place telephone calls to the agents 108a via a Public Switched Telephone Network (PSTN). When a client telephone call 100 arrives at the ACD 102, the call is received by an ACD route point 103. PSTN calls are generally forwarded to a group of ACD agents 108a having like skills (the ACD Skill/Split Hunt Group) rather than to a specific one of the agents. The ACD 102 routes incoming calls through the ACD route point 103 which typically comprises a phone number in the numbering plan of the ACD 102 that works in conjunction with a call handling instructions script, referred to as a routing program 104. An ACD object 105 controls the routing program 104 to enable customized call processing specifications in the ACD 102. The routing program 104 tells the ACD's call processing software how to treat the client's call 100. The routing program 104 typically includes at least one announcement and at least one queue statement. The queue statement directs the call to a specific ACD Skill/Split Hunt Group 106. The ACD Skill/Split Hunt Group 106 has a single phone number, a Pilot Directory Number (Pilot DN) 107 that subsequently directs the client telephone call directly to one of the available agents 108a within the ACD Skill/Split Hunt Group 106.

As shown in FIG. 1, the ACD 102 may have multiple route points 103, multiple routing programs 104, multiple ACD objects 105, and multiple ACD Skill/Split Hunt Groups 106. The discussion provided herein generally refers to a single set of ACD elements for ease of understanding, as the operations of multiple ACD elements may be extrapolated from the description of the operation of a single set of such elements.

Each agent workstation 108 has a telephone that receives calls directed to either of two numbers. The first number is the phone number for the telephone instrument itself at the agent workstation 108, or the Phone Directory Number (Phone DN). The second number is a phone number corresponding to the agent 108a, i.e., an Agent Directory Number (Agent DN). The Agent DN follows an individual call center agent. Thus, the agent 108a may switch from one agent workstation 108 to another agent workstation 108 and still retain the same Agent DN. If the agent 108a is not working on a particular day, or has not otherwise logged into the call center, then the Agent DN will not be active, and a party calling the Agent DN will receive a message to this effect.

A Call Control application server 110 communicates with the ACD 102 through a Computer Telephony Integration (CTI) link 109. The Call Control application server 110 comprises a standard computing system, such as a PC, and a CTI server application which processes calling information for various agents 108a via their associated Softphone applications 111. Each agent 108a typically has a terminal that provides a graphical user interface to the Softphone application 111. The Softphone application 111 emulates many of the button functions of an ACD/PBX feature phone. For example, an agent 108a places a call on hold by using a hot key on the application 111. Engaging the hot key causes the application 111 to send a command through the CTI link 109 to direct the ACD 102 to place the call in a holding state. Most CTI links support call hold of a single call, even in a Softphone system.

The Call Control application server 110 synchronizes the Softphone application 111 with the ACD 102 by sending event messages to the Softphone application 111 pertaining to the set of Agent DNs and Phone DNs that have been provided with the Softphone capability. The Call Control application server 110 services telephony commands from the Softphone application 111 to provide the agent 108a with a Softphone. In a typical configuration, each agent 108a has access to an individual copy of the Softphone application 111 at his or her workstation 108. The Softphone application 111 servicing each agent workstation 108 may be run from the Call Control application server 110, for example, in an internet browser-based implementation. The combination of the agent workstation 108 utilizing a POTS and the Softphone application 111 provides the agent 108a with many of the features available on more expensive ACD/PBX feature phones.

In a Softphone-equipped call center, such as the call center shown in FIG. 1, a client call 100 may reach an individual agent 108a in several different ways. The client call 100 may reach the agent 108a through the ACD route point 103. This method of calling does not necessarily reach a specific agent 108a but instead reaches any available agent 108a in the ACD Skill/Split Hunt Group 106. This method provides general calling but is unsuitable for reaching a specific one of the agents 108a. A client call 100 may reach a specific agent 108a by placing a phone call to the Phone DN at the agent's workstation 108. This method directs the call to a specific telephone instrument, whether the agent 108a is present or not. This method is often unfruitful for contacting a specific agent 108a because the agent may have moved to another workstation 108, may be busy on another call, or may not otherwise be available. As more than one agent frequently occupies the same physical workstation associated with a Phone DN, call center management may also prefer that incoming calls not be routed through the Phone DN to avoid slowing the productivity of other call center agents who may answer calls directed to their Phone DNs that were intended for the call center agent who previously occupied that particular Phone DN. In another approach, the client call 100 reaches the agent 108a by using the Agent DN. This method allows the call to follow the agent 108a to the actual telephone instrument presently being used by the agent. The Agent DN constitutes a personal phone number for the agent 108a and returns a busy signal if the agent 108a is not logged into the ACD 102. The Agent DN connects the call to the agent 108a if the agent is available when the call arrives. If the agent 108a is busy on another call, the caller hears a ringback tone until the agent is free. The ACD 102 typically generates an audible prompt which the agent 108a hears while on the other call. The agent 108a only hears the audible prompt when a call arrives at the workstation 108 from the Agent DN or the Phone DN. If no agent 108a is available in the ACD Skill/Split Hunt Group 106 when a call arrives, the ACD 102 simply queues the call, and the agent 108a hears nothing (because the call is not actually waiting for any particular agent). In some call centers, the ACD 102 may direct a light to flash at the agent workstation 108 when a call arrives through an Agent DN. The typical CTI link 109 does not provide an event message notifying a CTI-enabled application, such as the Softphone application 111, about the waiting call.

Not all of the features provided in a call center equipped with ACD/PBX feature phones are available in a Softphone call center. For example, call center agents frequently need to handle multiple telephone calls at the same time, such as when an incoming call is directed to their Agent DN while the agent is already speaking with another caller, as discussed above. In addition, call center agents associated with a predictive dialer blending configuration need to park an outbound call associated with the predictive dialer in order for the agent to receive inbound calls. Using an ACD/PBX feature phone, a call center agent may handle multiple calls by creating a queue of calls that the agent may then selectively retrieve. A conventional ACD/PBX feature phone enables multiple call handling for an agent by providing Call Park and Call Pickup functions. Call Park provides an agent with the ability to park a call at a unique parking address, freeing the agent to take other inbound calls waiting in the ACD, make outbound calls, and perform other telephony operations. Call Pickup allows the agent to retrieve a specific call from its unique parking address and then resume the original phone conversation. For some ACDs using ACD/PBX feature phones, the agent can park only one call. For other ACDs, the agent may park a limited number of multiple calls. Depending on the ACD design, these calls may be either in a First-In First-Out (FIFO) queue of parked calls or they each may be at a unique parking address in a queue of parked calls. While parked, a caller typically hears either music, silence, or an appropriate message. Call Hold, another telephony feature, differs from Call Park in that Call Hold only allows an agent to place one phone call in a temporary state. When a caller is placed on hold, no calls waiting in the ACD are routed to the agent, and the agent may only make outgoing calls.

Softphone call centers presently have no capability for providing flexible, multiple call handling and queuing operations in a manner independent of the telephone instrument deployed in the call center. For example, the Lucent® Definity G3 ACD allows for one parked call, while the Northern Telecom Meridian ACD provides no Call Park facility via the proprietary ACD CTI link. Also, most Softphone applications are written in reliance upon third party CTI Middleware which serves as a higher level programming language access to the proprietary CTI link. The CTI Middleware generally do not provide for Call Park/Pickup. IBM CallPath, Dialogic CT-Connect and Genesys T-Server are exemplary CTI Middleware products.

For this reason, existing Softphone call centers generally do not support the Call Park and Call Pickup functions provided by ACD/PBX feature phone installations. While Call Park and Call Pickup are useful call center features, they are also not typically supported by the CTI link. These features are also not typically supported by third party CTI Middleware, and if supported at all, support only one call per the aforementioned ACD limitation. Thus, even if the ACD/PBX deployed in a call center supports call queuing, call center agents may not be able to use Call Park and Call Pickup because the CTI link or third party CTI Middleware used by their call center does not support these features.

A Softphone application's requirements resemble those of a robotic call processing application. The primary difference is that the Softphone manages calls arriving at a specific Phone DN while a robotic application manages calls arriving at a specific route point DN. FIG. 2 shows a robotic application 211 communicating with the route point 103. The robotic application 211 may communicate with both the route point 103, the ACD Skill/Split Hunt Group 106, and the Agent DN and the Phone DN at the agent's workstation 108. Some robotic applications 211 may receive information from callers 100 and may, in some instances, handle a call in a manner much like that of a call center agent 108a. As robotic technologies grow more sophisticated, robotic applications, such as robot application 211, may even begin replacing many, or in some instances all call center agents 108a, and may also replace many ACD capabilities such as those provided by routing programs 104 and ACD Skill/Split Hunt Group 106. Robotic application 211 can therefore be considered a robotic call center agent having many similar needs to a human call center agent or as a robotic application that replaces many of the aforementioned ACD capabilities. The robotic application 211 may need to park calls and then route them to other agents or to other robotic resources such as an Interactive Voice Response (IVR) or voice mail. Accordingly, robotic applications have a need for similar Call Park/Call Pickup functions to those of a human call center agent. In many instances, robotic applications require capabilities beyond those required by human call center agents, such as handling many more calls than would a human agent. In other words, the robotic application 211 requires the capability to queue calls such that a specific call can be removed out of its order of arrival in comparison to the other queued calls and distributed to a call center resource. A call center resource can be either a call center agent or a call center robotic agent such as an IVR application or a voice mail application. For example, suppose a call arrives from a very high-valued caller 100 and the call needs to be queued in the ACD 102 to wait for an agent 108a with a specific set of skills to support this customer. Another example is that of a high value call that arrives at the ACD 102 and is delivered to an agent 108a ahead of previously queued calls because the call is associated with a high-valued customer, causing the other calls to continue waiting in a queue for service. A robotic application that supports such capabilities is popularly called "skills based routing" when agent skills are involved and "host based routing" when agent skills are not a criterion. Essentially, the same ACD limitations that thwart Call Park in Softphone applications also prevent robotic applications from providing high-value call distribution capabilities such as skills based routing. These limitations also prevent third parties from building high-value ACD call distribution functionality outside of the ACD without resorting to some form of adjunct hardware solution. Without a capability to queue a large number of calls and retrieve the calls in any order, a third party call routing application must essentially allow the ACD to retain control over the distribution of queued calls.

SUMMARY OF THE INVENTION

The invention provides a method and system for allowing a call center agent to queue with no practical limit a number of telephone calls indefinitely in a call center, regardless of the type of telephone instrument deployed in the call center. The invention also provides a method and system for allowing a call center robotic application to queue a virtually unlimited number of telephone calls indefinitely in a call center associated with an ACD route point. In the invention, a multiple-call handling (MCH) application in the Call Control application server utilizes one or more call route points within the ACD/PBX to queue agent-selected calls or robotic application-selected calls. When an agent, or robot application, indicates that a call should be queued, the MCH application in the Call Control application server instructs the ACD/PBX to transfer the call to a route point, which effectively provides a queue. If the ACD/PBX has a default routing timeout period for unassigned calls, then the MCH application instructs the ACD/PBX to transfer the queued call to a second route point in the ACD/PBX before the default routing occurs. If another default routing time period nears expiration while the call is still queued, then the MCH application in the Call Control application server instructs the ACD/PBX to transfer the call back to the first route point. The MCH application maintains a database of queued call records for locating specific queued calls, such as when an agent (or robot application) wishes to retrieve a queued call. The process of juggling a call from route point to route point may be continued indefinitely, although the invention further permits the setting of a maximum queuing period. Juggling calls from one route point to another avoids the default timeout mechanism for unassigned calls in many ACD/PBXs as well as limitations in the number of calls that can be queued at a route point.

BRIEF DESCRIPTION OF THE DRAWINGS

A preferred embodiment of the present invention will be described below relative to the following figures. Note that similar elements and steps in the figures have the same reference number.

FIG. 7 illustrates a typical display provided by an exemplary user interface of the invention to an agent, such as the agent of FIG. 3. The user interface shows the calls that the agent has parked in the ACD/PBX which the agent may retrieve on an individual basis in any order.

DETAILED DESCRIPTION OF THE INVENTION

Figure 1:
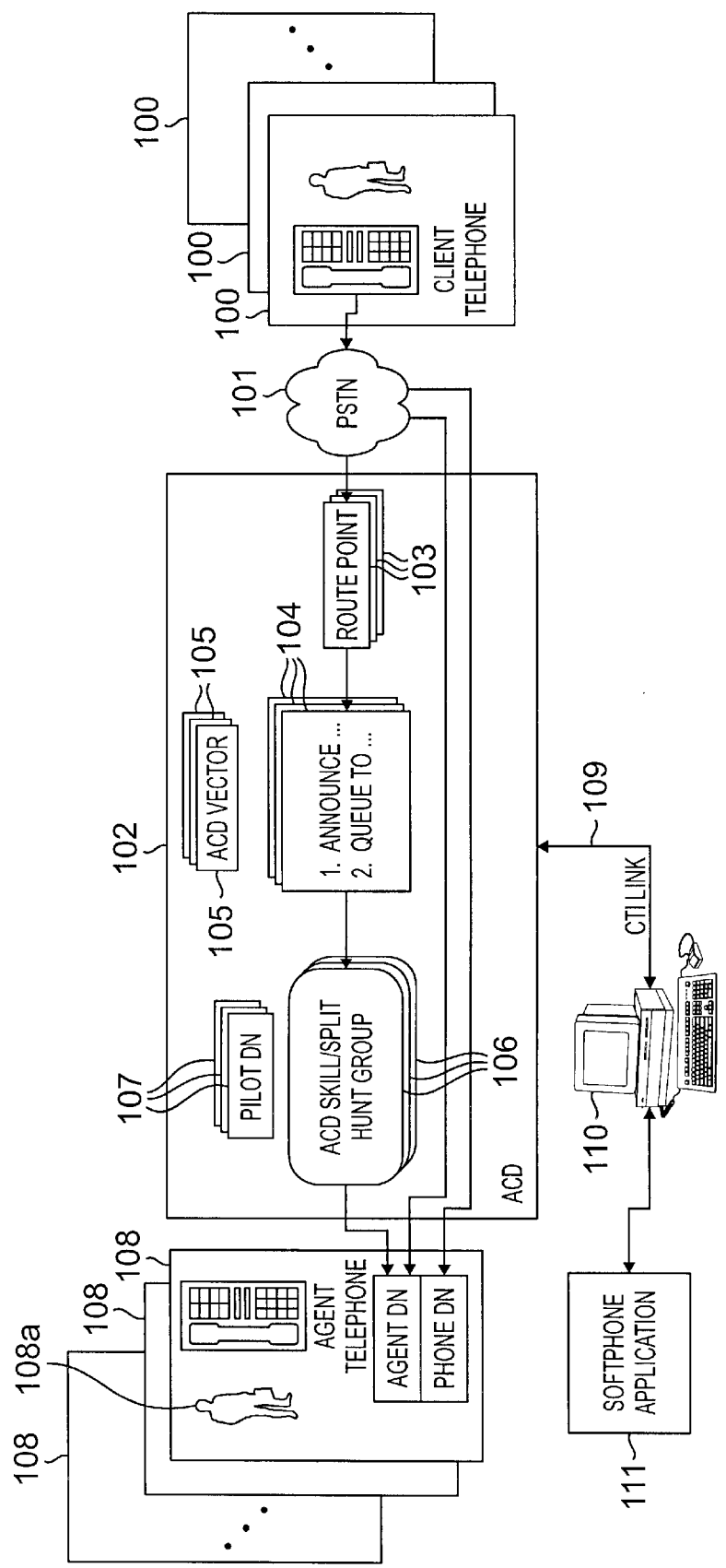
FIG. 1 illustrates a conventional Softphone-configured call center.

The invention provides multiple call handling for each agent in a call center regardless of the telephone instrument at the agent's workstation. The invention also provides call queuing at each agent telephone in the call center with no practical limit on the number of calls queued. The invention further provides agent workstations with Call Park and Call Pickup functions through a computer program operating in conjunction with a Call Control system. The invention provides these features for call centers whether equipped with the ACD/PBX manufacturer's proprietary feature phones, Plain Old Telephone Sets (POTS), or ACD/PBX feature phones from a different manufacturer than the manufacturer of the call center's ACD/PBX. The invention further provides multiple call queuing via a CTI link even if the ACD/PBX and/or the CTI link and/or third party CTI Middleware do not provide this capability themselves. The invention provides call queuing and queued call retrieval for multiple calls at each agent's workstation, wherein each call has a unique address that allows the agent to select a particular queued call for retrieval, regardless of the order in which the calls were queued.

The invention further provides multiple call handling for each robotic application associated with a route point. The invention also provides call queuing at each route point in the call center with no practical limit on the number of calls queued. The invention further provides robotic applications with Call Park and Call Pickup functions through a computer program operating in conjunction with a Call Control application server. The invention also provides multiple call queuing for calls in robotic applications via a CTI link even if the ACD/PBX and/or the CTI link do not provide this capability themselves. The invention provides call queuing and queued call retrieval for multiple calls at a route point, wherein each call has a unique address that allows the robotic application to select a specific queued call for retrieval, regardless of the order in which the calls were queued.

The inventors of the present invention made the key discoveries behind the invention based upon their keen awareness of ACD/PBX design and operations. The inventors first analyzed the following limitations in the typical ACD/PBX.

The inventors knew that an ACD/PBX typically limits the number of undirected calls in a call center. An undirected call is a call not directed to an Agent DN or a Phone DN. The Lucent® Definity G3 System, for example, limits the number of undirected calls at any instant to 127. Thus, the inventors realized that their solution would need to minimize the number of call routing associations consumed by undirected queued calls. A typical ACD/PBX strives to direct each call to its ultimate destination, such as to an agent's telephone. To provide this functionality, the ACD/PBX maintains an open association list for undirected calls. The inventors understood that this list could be externally managed by a software application operating through the CTI link.

The inventors further recognized that some ACD/PBX's have a default routing timeout period that arises for all unrouted calls after a fixed time period. A call assigned to a particular route point will only remain at the route point for a limited period of time before the ACD/PBX automatically reroutes the call. For some ACD/PBXs, this default period may be as long as a minute while for other ACD/PBXs this period can be as short as three to four seconds. The default timeout period for ACD/PBXs represented another ACD/PBX limitation that the inventors knew they would have to overcome for some call center installations.

The inventors further recognized many similarities between an ACD/PBX having a Softphone application and a robotic application operating in conjunction with an ACD route point. As an example of the limited capabilities presently accorded robotic applications, a conventional ACD may permit a robotic application to queue calls at the route point in the ACD with which the robotic application is associated. However, some ACDs will allow a call to be queued at a call routing point for only 3–4 seconds, while other ACDs only allow for a limited number of such queued calls, and still other ACDs have limitations on the total number of such queued calls across all robotic applications. In general, an unlimited call queuing capability in full support of such robotic applications is not available in a conventional ACD. For example, the Lucent® Definity G3 allows a robotic application to queue calls for 999 seconds, but has a system-wide limitation for such calls of only 127 calls. The Northern Telecom Meridian ACD allows a robotic application to queue calls for only 3–4 seconds. Upon review of these limitations, the inventors further recognized that with a genuine capability to queue calls in an ACD and to retrieve these calls out-of-order, a third party could build very sophisticated call routing capabilities that far exceeded the capabilities of the ACD as provided by its manufacturer.

In deciding how to provide unlimited call queuing in a Softphone call center on a telephone-independent basis, the inventors were also aware that the prior art methods for providing a Call Hold function would be of no assistance to them. The inventors realized that a solution to this problem would require some type of an index linked to the queued call that could be used to distinguish one call from another. A held call in a typical ACD/PBX has no call identifier. Thus, a held call is only associated with either a particular telephone instrument or a particular agent. Moreover, a held call is never completely free of an agent's phone, as discussed above. Without a call index, multiple calls may not be queued and retrieved for the same agent.

The inventors further recognized that an ACD/PBX is a configurable device having control software that allows a variety of call directing devices to be configured to it. Because of the amount of information that must be individually tailored for each call center, ACD/PBXs include configuration tables that are administrated through a device commonly referred to as the ACD maintenance console. As a practical matter, setting up a call center requires entering site-specific information such as the Agent DNs for the agents within the call center and the Phone DNs for the call center telephones. The maintenance console also allows logical functions, like the Agent DNs, to be matched to physical functions, like the Phone DNs. The maintenance console also allows Agent DNs to be assigned to Skill/Split Hunt Groups, and the appropriate calling scripts to be developed for the ACD Skill/Split Hunt Groups. The maintenance console also allows a robot application to be associated with a route point.

Thus, the invention results from the inventors' discovery that the configurable software that controls ACD's and PBX's may be directed to create an additional route point in the ACD/PBX and that a computer program external to the ACD/PBX can control the additional route point to provide multiple call queuing independent of the particular telephone instrument used in the call center. The inventors knew that this solution would sidestep the typical ACD/PBX's limitation on the number of undirected calls because placing the calls in a route point would not increase the number of calls in the open association list.

The inventors further discovered that the default timeout routing, for those ACD/PBXs having such a limit, could be avoided if a second new route point was created and an external computer program transferred the queued call from the first new route point to the second new route point before the timeout arose. In other words, the inventors discovered that they could direct the configurable software for an ACD/PBX to create a second new route point, and then a computer program external to the ACD/PBX could juggle a queued call back and forth between the new route points to thwart the ACD/PBX's default routing timeout period.

The inventors' first new route point operates as follows. When a newly queued call arrives, the first new route point executes a route request to the external computer program controlling call queuing. The first new route point then waits for a redirection command from the external computer program while providing music or another appropriate message to the caller during the wait. A wait time should be established, such as two seconds, according to the default timeout period of the particular ACD/PBX deployed. If this wait time elapses, then the call is automatically routed for default call treatment, such as being re-queued to an agent Skill/Split Hunt Group. For some ACD/PBX systems, the adjunct routing step must be the first command in the first new route point and must be performed without any delay. Providing instructions in the first new route point for default call treatment provides a mechanism for disposing of queued calls in the event of a system failure that adversely affects the queuing of calls. For example, should the external computer program handling call queuing fail, the default call treatment will eventually empty the new route point of all queued calls. However, in the normal case, the computer program will send a call routing instruction to the new route point directing the newly queued call to another location prior to the expiration of the default timeout period.

The second new route point should be designed to perform as follows. First, the second new route point executes a waiting period of a few seconds with an optional treatment, such as providing music or another message. When the waiting period has elapsed, the call is routed back to the first new route point.

The inventors created an external computer program that monitors and controls queued calls in the new route points by sending messages through the CTI link. As discussed above, for those ACD/PBXs having a default timeout for undirected and/or unrouted calls, the external computer program avoids the default routing by rerouting a call from one new route point to another new route point prior to the expiration of the default timeout period. The external computer program also sends commands through the CTI link which enables selective dequeuing of calls as well as other instructions to the route points.

As discussed above, creating new route points in the ACD/PBX is a key step in performing one embodiment of the invention. Presently, ACDs and PBXs do not have standardized designs. Thus, creating the new route points requires knowledge of the design of the ACD or PBX used in the call center. A skilled artisan in the ACD/PBX arts is typically charged with such knowledge. However, to provide the fullest possible disclosure, a description will be provided below describing how to provide the new route points in one particular ACD. While this disclosure pertains to one particular ACD, the general principles of the invention pertain to all ACD/PBXs.

The following four tables describe the configuration of the two new route points for a specific ACD, the Lucent® Definity G3 switch (the Definity switch). The tables below appear as they would using the display capability provided by the Definity administration console. Lucent® terminology has been used in this description, and any terms not familiar to the skilled artisan may be referenced in the appropriate Lucent® technical literature. In a Definity switch, an ACD Vector is called a Vector Directory Number (VDN) and its associated script is called a Vector. The new route points needed for this embodiment of the invention consist of an ACD Vector (such as the ACD vector 105 shown in FIG. 1) and an associated Vector script (such as the vector script 104 shown in FIG. 1).

A first new route point has the name "First New Route Point" and consists of the VDN 20416, shown below in Table I. VDN 20416 invokes an associated program contained in Vector Number 43, shown below in Table II. While all of the settings in Table II are important, the programming steps contain the decision logic for holding a call and disposing of a call. The first step, "Step 01 (adjunct)," instructs the Vector program to send a notification of a call's arrival to the ACD CTI routing link 24187 when the call arrives. (Note: A multiple call handling (MCH) application, such as the MCH application 316 to be discussed with regard to FIG. 3 listens for these notifications.) The second step, "Step 02 (route-to)," instructs the Vector program to hold the call for 6 seconds while waiting for a response from the MCH application. The third step, "Step 03 (disconnect)," instructs the Vector program to disconnect the call without playing an announcement if the call is not routed by the MCH application within 6 seconds.

TABLE I

Exemplary Definity VDN for First New Route Point

| | |
|---|---|
| Extension: | 20416 |
| Name: | First New Route Point |
| Allow VDN Override? | N |
| COR: | 1 |
| TN: | 1 |
| Vector Number: | 43 |
| Measured: | none |
| 1$^{st}$ Skill: | |
| 2$^{nd}$ Skill: | |
| 3$^{rd}$ Skill: | |

TABLE II

Exemplary Definity Vector for First New Route Point

Vector Number: 43    Name: First Park Vector

| Basic? Y | EAS? Y | G3V4 Enhanced? Y | ANI/II-Digits? Y | ASAI Routing? Y |
|---|---|---|---|---|
| Prompting? Y | LAI? Y | G3V4 Adv Route? Y | INFO? N | |

```
01 adjunct       routing link 24187
02 route-to      6 secs hearing ringback
03 disconnect    after announcement
                 none
04
05
06
07
08
09
10
11
```

A second new route point has the name "Second New Route Point" and consists of the VDN 20415, shown below in Table III. VDN 20415 invokes an associated program contained in Vector Number 45, shown below in Table IV. While all of the settings in Table IV are important, the programming steps contain the decision logic for holding a call and disposing of a call. The first step, "Step 01 (wait-time)," instructs the Vector program to play a ringback to the calling party for 6 seconds when a call arrives. (Note: this is the normal ringback cycle for the Public Switched Telephone Network (PSTN)). The second step, "Step 02 (route-to)," instructs the Vector program to redirect the call to the First New Route Point.

TABLE III

Exemplary Definity VDN for Second New Route Point

| Extension: | 20415 |
|---|---|
| Name: | Second New Route Point |
| Allow VDN Override? | n |
| COR: | 1 |
| TN: | 1 |
| Vector Number: | 45 |

TABLE III-continued

Exemplary Definity VDN for Second New Route Point

| Measured: | none |
|---|---|
| 1$^{st}$ Skill: | |
| 2$^{nd}$ Skill: | |
| 3$^{rd}$ Skill: | |

TABLE IV

Exemplary Definity Vector for Second New Route Point

Vector Number: 45    Name: Second Park Vector

| Basic? Y | EAS? Y | G3V4 Enhanced? Y | ANI/II-Digits? Y | ASAI Routing? Y |
|---|---|---|---|---|
| Prompting? Y | LAI? Y | G3V4 Adv Route? Y | CINFO? N | |

```
01 wait-time   6 secs hearing
               ringback
02 route-to    number 20416   with cov n if
                              unconditionally
03
04
05
06
07
08
09
10
11
```

Figure 3:
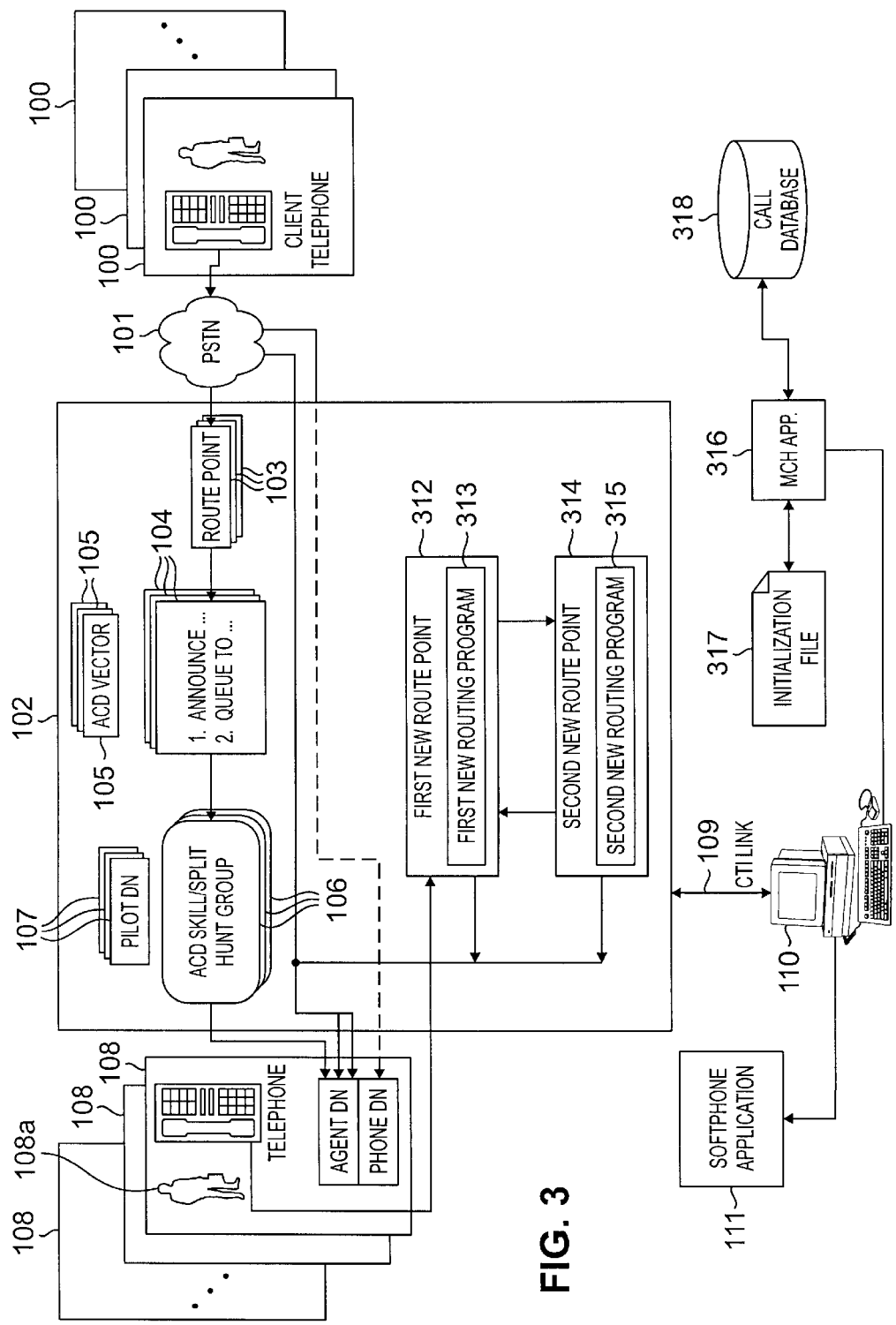
FIG. 3 depicts a call center configured for the Softphone environment provided by one embodiment of the present invention.

FIG. 3 depicts a call center configured for the Softphone environment provided by one embodiment of the invention. As shown in FIG. 3, the Softphone environment of FIG. 1 has been modified to include the additional functionality needed for an ACD/PBX that has both a limit on the number of undirected calls and a default routing timeout period. The ACD 102 has been modified to include a first new route point 312, a first new routing program 313, a second new route point 314, and a second new routing program 315. The ACD 102 may be modified to include these additional items in the manner described above, or by any appropriate manner for the particular brand of ACD equipment known to one skilled in the art of ACD/PBX operations and maintenance. As previously discussed, an ACD/PBX has a maintenance console that may be configured for particular calling arrangements and may be used to create new route points such as the first new route point 312 and the second new route point 314.

As shown in FIG. 3, the Call Control application server 110 has been modified to include a multiple call handing (MCH) application 316, an initialization file 317, and a call database 318. The initialization file 317 provides the proper configuration for the MCH application 316 and initializes the call database 318 to receive information from the MCH application. The call database 318 may be any data repository having a sufficient capacity to store all the calling data required of the MCH application 316.

The first new route point 312, following the instructions in the first new routing program 313, notifies the MCH application 316 when a queued call arrives at the first new route point. The MCH application 316 then transfers the call to the second new route point 314 prior to the expiration of the ACD default timeout period. If the second new route point 314 still retains the queued call as the ACD default timeout period arrives a second time, then the second new route point 314, following the instructions in the second new routing program 315, transfers the call back to the first new route point 312 before the ACD default timeout expires. This process may occur over and over until the call has been queued longer than a configurable time period or until the agent enters a call deliver or call discard message to the Softphone application 111. Of course, the transfer times set in the route points and in the MCH application 316 must be less than the ACD default timeout in order for the multiple call handling system to work as described. If a call deliver or call discard message arrives from the Softphone application 111, then the MCH application 316 redirects the call accordingly.

The first new route point 312 retains the call for only a brief period of time before the MCH application 316 redirects the call to the second new route point 314 where the call also waits for only a brief time. Queuing the call in the new route points minimizes the number of call routing associations consumed by parked calls. Most ACDs have limitations on the number of undirected calls, which is overcome by these new route points. Using this solution, a given call never has an undirected status for more than a brief instant. Thus, this approach effectively increases by tenfold or more the limit of the ACD 102 for undirected calls. As discussed previously, some ACDs also redirect all unrouted calls after a certain period. The present invention overcomes this limitation within the ACD 102 through the described process of juggling calls back and forth between the first route point 312 and the second route point 314.

The MCH application 316 processes service requests from the Softphone application 111 and event messages from the ACD 102. These service requests include command messages, call disconnected messages, call redirected messages, and command response messages. The MCH application 316 essentially maintains a thread that services these requests and event messages as they arrive from the Call Control application server 110. A thread is a process that is part of a larger process or program.

The Softphone application 111 queues, or parks, a call on the ACD 102 by transferring the call to the control of the MCH application 316 with an associated "call park" message. The MCH application 316 keeps the queued calls in a perpetual call processing state within the ACD 102 as discussed above although the state is terminable, as desired. The MCH application 316 responds to the call park message from the Softphone application 111 by sending a command through the CTI link 109 that transfers the call to the first new route point 312, sending a park call response message to the Softphone application 111, and by making an appropriate entry in the call database 318.

An agent retrieves a parked call by selecting a specific parked call from the graphical user interface on the Softphone application 111. This action directs the Softphone application 111 to send a call retrieval message to the MCH application 316. The MCH application 316 responds by redirecting the parked call to the Agent DN of the workstation 108 of the requesting agent.

The Softphone application 111 may also direct the MCH application 316 to purge a parked call by sending a "drop call" message. The MCH application 316 responds to the Softphone application 111 with a call discard response and purges the call database 318 of the discarded call. The MCH application 316 redirects a discarded call to the Default DN of the ACD 102. Thus, the discarded call is not necessarily disconnected from the call center but merely disassociated from a particular agent's workstation.

The MCH application 316 transfers any call for which it has received insufficient information to the timeout route point of the ACD 102 and logs the event in the call database 318. The log may be forwarded to the Softphone application 111 or examined by the appropriate supervisory personnel. An abundance of such incomplete calls may signal an anomalous condition in the call center or in a particular piece of its equipment, such as the agent workstation 108.

When a parked call is released, the MCH application 316 logs the call to a log file, such as a file called "Callpark.dat." The information for each released call may include a Unique Call Index, the Agent DN, the Agent Phone DN, the parked time, the released time, and the release status. Depending on how the parked call is released, the released status can be: "delivered," "discarded," "caller hung up," or "parked call timeout." This log may also be examined by appropriate supervisory personnel to ensure that the multiple call handling system is functioning within expected parameters.

The MCH application 316 records the time each call is initially parked in the call database 318. If a call has been parked longer than a configuration time period, the MCH application 316 redirects the call to the Default DN for the ACD 102. The configurable time period may be adjusted in the MCH application 316 by appropriate call center supervisory personnel.

If a caller hangs up while a call is parked, the CTI link 109 notifies the MCH application 316 of this event through a call disconnected message. The MCH application 316 then sends a call disconnected message to the Softphone application 111. The Softphone application 111 then notifies the agent 108a at the workstation 108 as appropriate.

The MCH application 316 provides a console utility for the graphical user interface of the Softphone application 111 to display a list of currently parked calls. The information for each parked call may include a unique call index, the Agent DN, the Agent Phone DN, and the time when the call was parked. FIG. 7 provides additional detail regarding the agent's user interface for multiple call handling.

The MCH application 316 processes several messages while parking and retrieving a call. Prior to parking a call, the Softphone application 111 sends a pre-park message to the MCH application 316. This message typically has the form "REQUEST_TO_PARK,<My AgentDN>,<My PhoneDN>,<Call Control application server assigned Call Id >." This message assures the Softphone application 111 that the MCH application 316 is active. Upon receiving the message, the MCH application 316 sends a response to the requesting Softphone application 111 having the format "OKAY_TO_PARK, <AgentDN>,<Agent PhoneDN>, <Unique Call Index>," where the Unique Call Index is assigned by the MCH application 316. If the requesting Softphone application 111 does not receive a timely response from the MCH application 316, the Softphone application 111 makes the agent 108a aware that the MCH application 316 is not active and further informs the agent 108a that calls may not presently be parked.

Upon successful receipt of the "Okay to Park" message, the Softphone application 111 parks the call by sending the command "PARK_CALL, <My AgentDN>,<My PhoneDN>,<Unique Call Index>" to the MCH application 316. The MCH application 316 then stores the calling information in the call database 318 to be retrieved by the associated Unique Call Index. The unique call index assigned by the MCH application 316 may be unique with respect to all the queued calls in the call center, and not merely unique to a particular agent's queued calls. Providing each queued call with a globally unique call index simplifies processing in the MCH application 316 because the MCH application 316 may communicate with the new route points using only the unique call index if necessary. In this approach, the Agent DN attached to the call then provides an error correction mechanism since the unique call index and its respective Agent DN should match in the call database 318.

When queuing a call, the MCH application 316 directs the ACD 102, through the CTI link 109, to blind transfer the call from the telephone at the agent workstation 108 to the first new route point 312. A blind transfer is a call transfer in which the transferor indicates a transfer location for a call without checking that the new transferred location is available. For example, in a conventional telephone system, a caller is typically placed on hold, then the transferor dials a phone number and hits a transfer button which initiates an automatic transfer of the call. A blind transfer contrasts with a supervised transfer in which the transferor actually verifies that the transferred number is available before the call is transferred.

Recalling the previous example using the Lucent® Definity G3 switch, the basic operation for this embodiment of the invention is as follows. A call enters the first new route point (VDN 20416) and a route request is sent from the ACD 102 to the MCH application 316 shown in FIG. 3. If the MCH application 316 does not receive a Retrieve Parked Call or Drop Call command from the Softphone application 111 within six seconds, the call is redirected by the MCH application 316 to the second new route point (VDN 20415). The second new route point introduces a six second wait and then routes the call back to the first new route point (VDN 20416). This process occurs repeatedly until either a Retrieve Parked Call or Drop Call command arrives from the Softphone application 111. If a Retrieve Parked Call command occurs, the MCH application 316 redirects the call to the Phone DN or Agent DN as specified by the Softphone application 111 in the Retrieve Parked Call command. If a Drop Call command occurs, the MCH application 316 disconnects the specified parked call.

The number of undirected calls in the ACD 102 (the limit in the Definity switch is 127) only applies to those calls that are momentarily being redirected by the MCH application 316 between the two new route points or to a final destination DN. Queued calls sit in the first new route point with the adjunct route command for only a few hundred milliseconds and then the queued calls sit in the second new route point for 6 seconds. Using this programming, the duty cycle for MCH parking of a call is then approximately:

$D$=300 milliseconds in first new route point/6000 milliseconds in the second new route point=approximately 0.05

Therefore, each queued call only factors into the undirected call limit 5% of the time. Using a six-second timer in the second new route point allows the MCH application 316 routing association limit of 127 calls in the Definity switch. The timer in the second new route point can be extended to support higher numbers of parked calls.

Figure 4A:
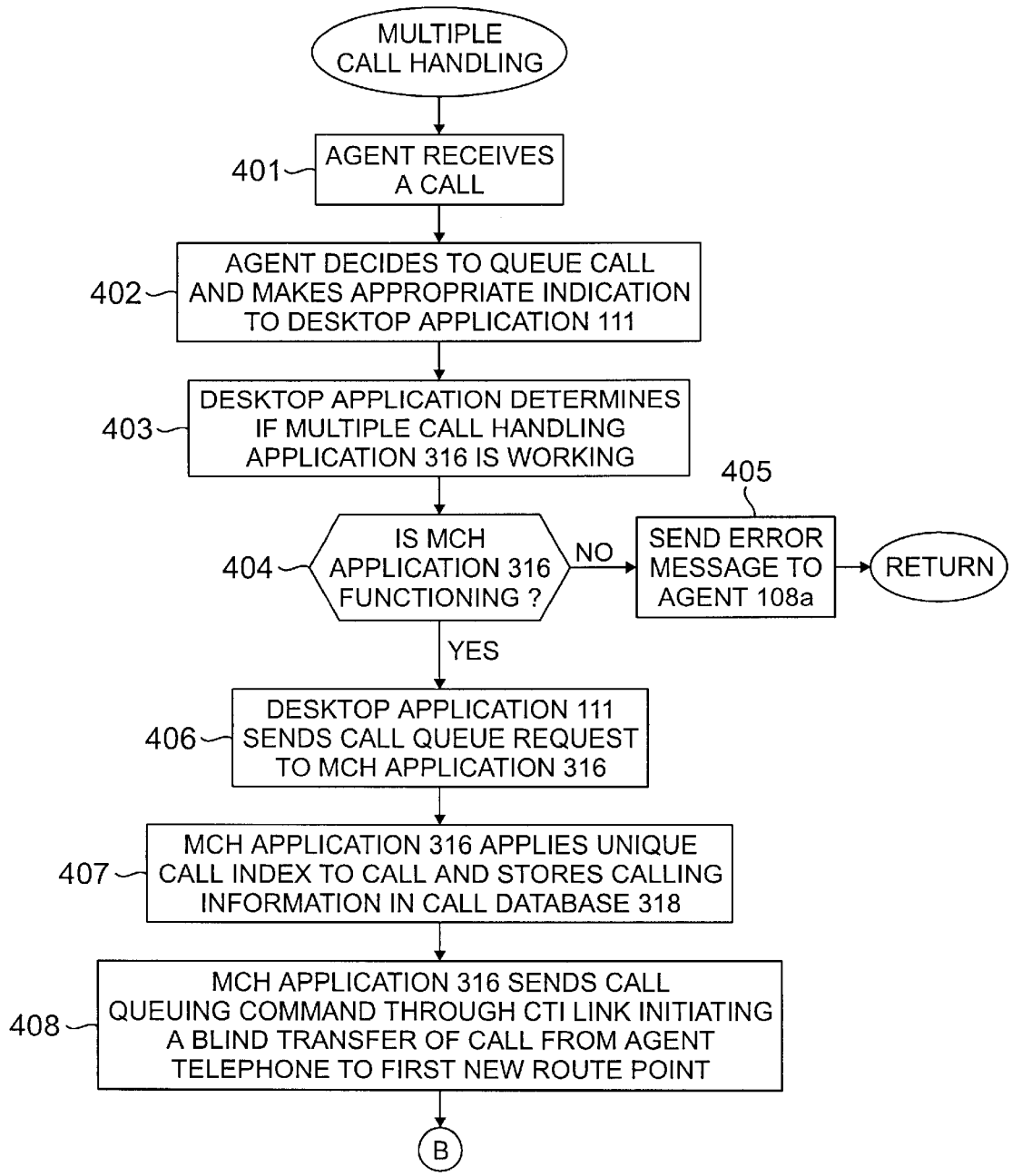
FIGS. 4A and 4B provide a flowchart illustrating multiple call handling according to an exemplary embodiment of the invention.
Figure 4B:
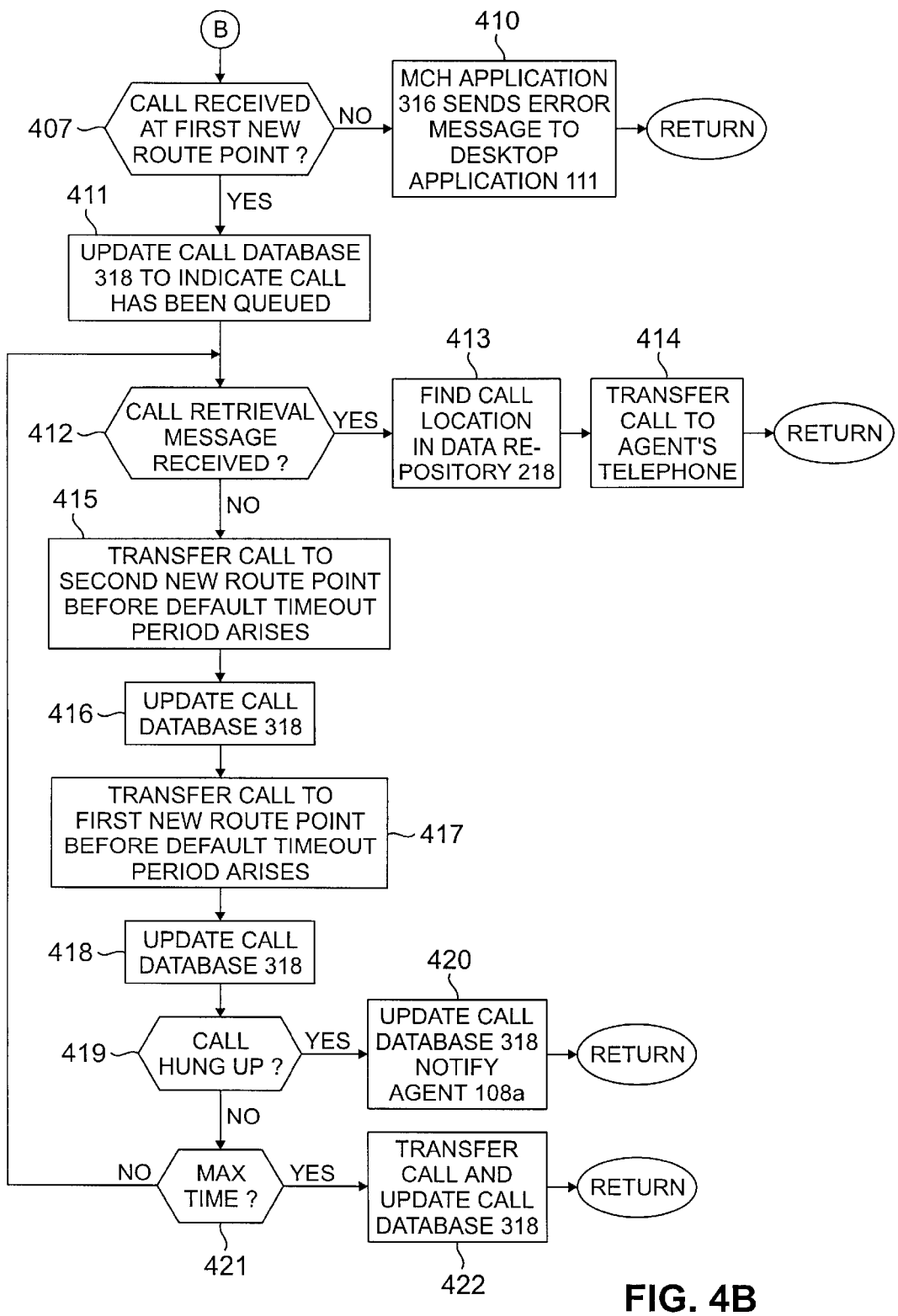

FIGS. 4A and 4B provide a flowchart illustrating multiple call handling according to an exemplary embodiment of the invention. An agent 108a at an agent workstation 108 receives a call (step 401). The agent then decides to queue the call and makes an appropriate indication to Softphone application 111 (step 402). The agent may decide to queue a call for any one of a number of reasons, including an indication that another call is already waiting for him, such as a call sent directly to his Agent DN.

In response to the agent's request to queue a call, the Softphone application 111 determines if the multiple call handling application 316 is presently working (step 403). If the multiple call handling application is determined to not be functioning (step 404), such as indicated by a failure to respond to the Softphone application's query, then the Softphone application 111 sends a message to the agent 108a informing him that the multiple call handling application is not presently working (step 405). If the Softphone application 111 receives an indication that the multiple call handling application is functioning (step 404), then the Softphone application 111 sends a queue request to the multiple call handling application 316 (step 406). The MCH application applies a unique call index to the call for which call queuing has been requested and stores this calling information in the call database 318 (step 407). The MCH application 316 then sends a call queuing command through the CTI link 109 indicating that a blind transfer of the call at the agent's telephone should be made to the first new route point 312 (step 408).

If the MCH application 316 does not receive an indication that the call has been received at the first new route point 312 (step 409 of FIG. 4B), then the MCH application sends an error message to the Softphone application 111 (step 410). The Softphone application 111 will then inform the agent in an appropriate manner. If confirmation is received that the call has been queued at the first new route point (step 409), then the MCH application 316 updates the call database 318 to indicate that the call has been queued (step 411).

The MCH application receives and responds to a call retrieval message from the Softphone application 111 (step 412). If such a call retrieval message has been received, then the MCH application 316 determines the present location for the requested call according to the call data in the call database 318 (step 413). The MCH application then transfers the call to the agent's telephone (step 414).

In the absence of a call retrieval message from the Softphone application 111 (step 412), the MCH application will transfer a queued call from the first new route point 312 to the second new route point 314 before the default timeout period for the ACD arises (step 415). The MCH application 316 will then update the call database 318 to indicate the present location of the queued call (step 416). The second new route point 314 will then transfer the call back to the first new route point 312 before the default timeout period arises for a second time (step 417). When this occurs, the MCH application 316 will then update the call database 318 to indicate the present location of the queued call (step 418).

Should a queued caller happen to hang up while the call is queued (step 419), then the MCH application 316 will update the call database 318 accordingly and notify the Softphone application 111 (step 420). Should a maximum call queuing time arise for a given queued call (step 421), then the MCH application will transfer the call to the Default DN for the ACD 102 and update the call database 318 accordingly (step 422). The MCH application 316 will also send a notification to the Softphone application 111 that the call has been queued for too long.

The process of routing calls between the first and second new route points 312 and 314 will continue until either a call retrieval message is received, the caller hangs up, or the maximum queuing period arises.

Figure 5:
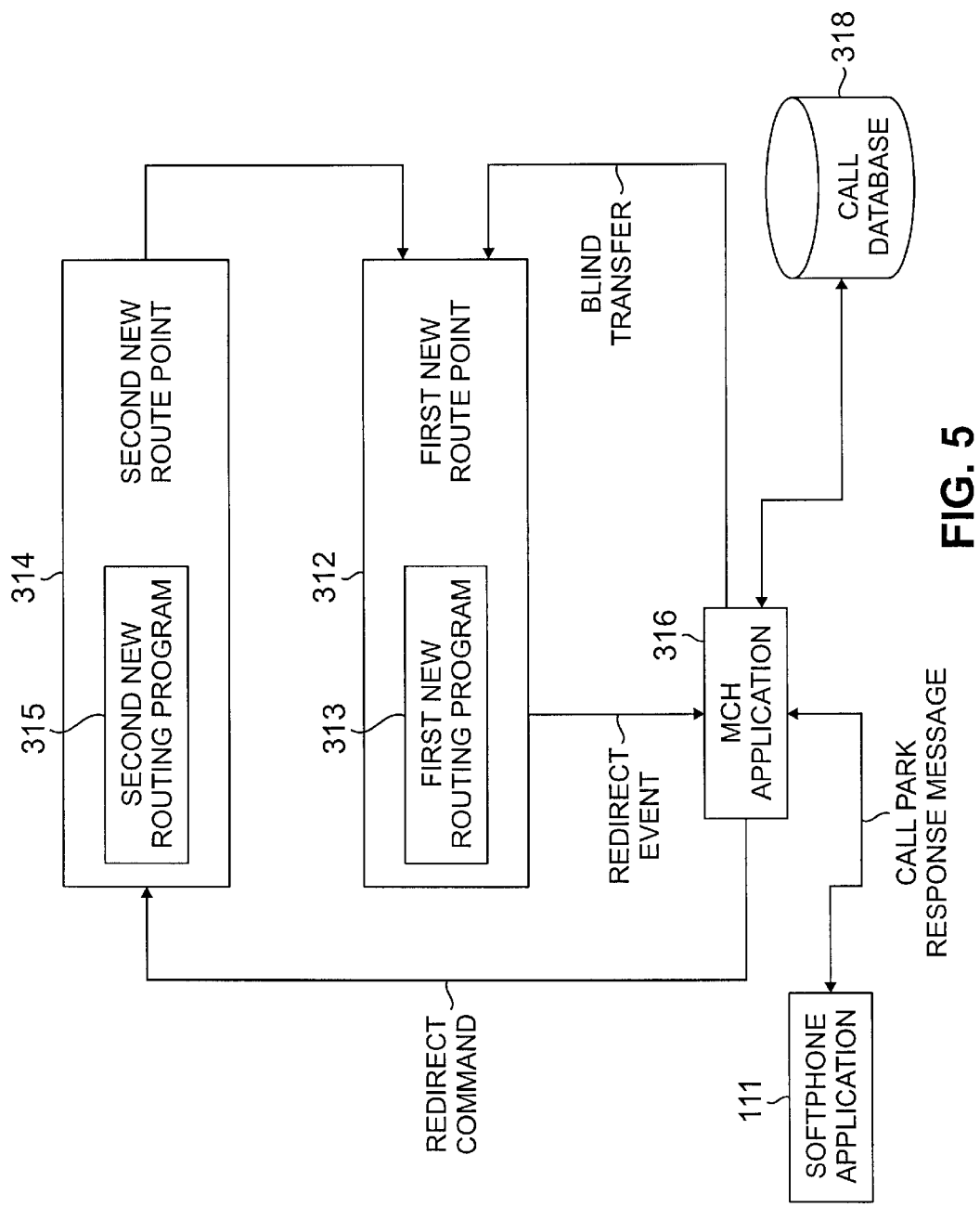
FIG. 5 illustrates commands and messages related to multiple call handling, according to one embodiment of the invention.

FIG. 5 illustrates commands and messages related to multiple call handling, according to one embodiment of the invention. As shown in FIG. 5, the Softphone application 111 sends a call park message to the MCH application 316. The MCH application 316 then blind transfers the call to the first new route point 312 through the CTI link 109. After the expiration of a predetermined time period less than the ACD's 102 default routing period for unassigned calls, the MCH application 316 initiates a redirect event that transfers the call to the second new route point 314, if the call has not been otherwise retrieved by the agent. After a specified period of time less than the default routing period for the ACD 102, the second new route point 314 then transfers the call back to the first new route point 312. This process of transferring calls back and forth between the first new route point 312 and the second new route point 314 may reoccur indefinitely until terminated by one of a variety of events.

When the call arrives at the first new route point 312, the MCH application 316 receives a "Call Redirected" message from the ACD 102. The MCH application 316 associates this message with the other information it already has about the call, such as the Agent DN and a unique index number in the call database 318. If the command is "Park Call," the MCH application 316 changes the state of the call from "Park Call" to "Call Queued" and may then redirect the call to the second new route point 314 as discussed. This process effectively queues calls indefinitely for the Softphone application 111 and the call center agents 108a.

Figure 6:
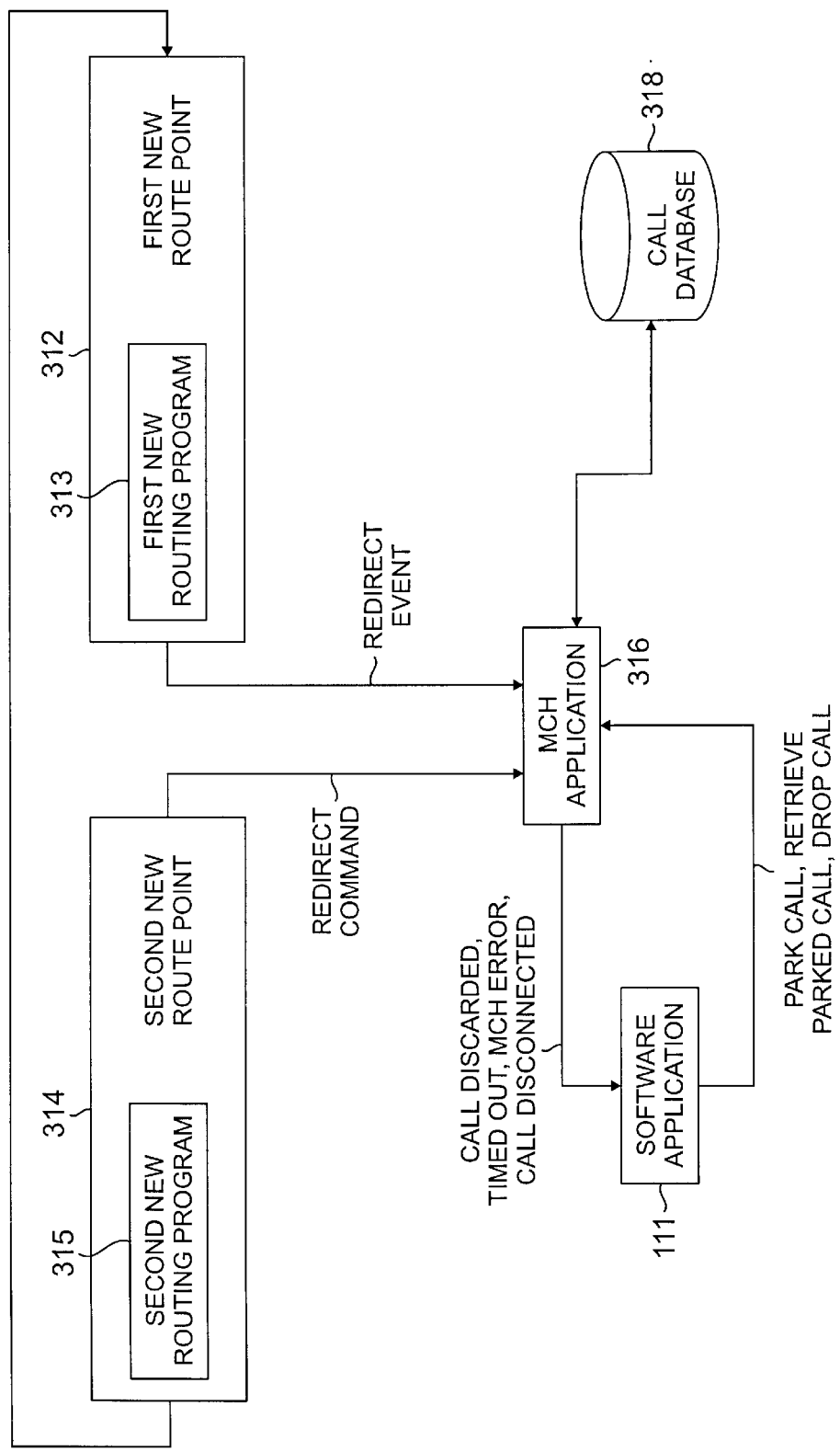
FIG. 6 provides additional description of the commands and messages that are sent between the various call center components of the one embodiment of the invention to provide multiple call handling.

FIG. 6 provides additional description of the commands and messages that are sent between the various call center components to provide multiple call handling. As shown in FIG. 6, the MCH application 316 may send the Softphone application 111 the messages Call Discarded, Timed Out, MCH Error, and Call Disconnected. The Softphone application 111 may send the MCH application 316 the commands Park Call, Retrieve Parked Call, and Drop Call. The MCH application 316 may send the second new route point 314 a Redirect command, and the first new route point 312 may send the MCH application 316 a Redirect Event message so that a parked call may be transferred before the end of the default timeout period for the ACD 102.

When an agent wishes to resume a parked call, he indicates to the Softphone application 111 which parked call should be retrieved. To retrieve a call, the Softphone application 111 sends the command message "RETRIEVE_PARKED_CALL, <My AgentDN>,<My PhoneDN>, <Unique Call Index>" to the MCH application 316. The MCH application 316 then references this information against the call data in the call database 318 to find the present location of the call, e.g., whether the call is in the first new route point 312 or the second new route point 314 or has been terminated. The MCH application 316 then sends a message through the CTI link 109 to blind transfer the call to the appropriate Agent DN. In other words, the call is delivered to the telephone of the agent 108a.

If the agent 108a decides to drop a parked call, the agent sends an appropriate notification to the Softphone application 111 which in turn sends a "Drop Call" message to the MCH application 316. The MCH application 316 then redirects the call to the default route point for the ACD 102. The MCH application 316 then sends the Softphone application 111 a "Call Discarded" response message. This process allows the agent 108a to selectively discard calls.

The MCH application 316 sends the following autonomous call status messages to the Softphone application 111. These autonomous messages are: Call Parked, Call Discarded, Call Disconnected, Timed Out, and MCH Error. The Call Parked and Call Discarded messages have been previously discussed. The Call Disconnected message arises when the caller hangs up. The Time Out message arises when the call has been queued past a configurable time period. The MCH error message arises when a failure occurs in the MCH application 316.

FIG. 7 illustrates a typical display provided by an exemplary user interface of the present invention to an agent, such as the agent 108 of FIG. 3. The user interface shows the calls that the agent has parked in the ACD/PBX which the agent may retrieve on an individual basis in any order. The Softphone application 111 presents this display to the agent based on information received from the MCH application 316. As shown in FIG. 7, a graphical user interface 700 provides a parked call identification chart 701. The parked call identification chart 701 includes the name of each parked caller, the time each call was parked, and the park duration for each call. As shown in the exemplary graphical user interface depicted in FIG. 7, the agent has parked six calls, 702–707. The Softphone application 111 provides the agent with a utility that allows entry of the name of the parked caller. The park time and the park duration information may be automatically supplied using information provided by the messages sent between the desk top application 111 and the MCH application 316.

The agent may retrieve a specific parked call by accessing a software radio button 708 displayed alongside each parked call such as the radio button displayed alongside the parked call 702. In one embodiment, the agent may access the radio button 708 by using either a combination of hot keys or by clicking on the radio button 708 using the cursor of a mouse. In another embodiment, the agent may be provided with a touch-sensitive screen and may simply touch the radio button 708.

By actuating the button 708, the agent 108a initiates the retrieval of the parked call which will then become available to the agent at the agent's telephone. The agent may select any of the six parked calls 702–707 which have been previously parked. In addition, the agent may actuate the six parked call retrieval buttons 708 in any order. Thus, the agent does not necessarily have to retrieve the calls in the order in which they have been stored.

The agent 108a is also provided with a call drop button 709 which is provided alongside each of the parked calls, such as the call drop button provided alongside the parked call 702. The call drop button 709 may be selectively actuated for any of the six parked calls 702–707. For example, the agent could use the call drop button 709 associated with the caller listed as "irate." Engaging the call drop button 709 initiates the return of the parked call to the Default DN for the ACD. Depending upon the type of call and the call center configuration, this may result in redirection of the call to the agent's Skill/Split Hunt Group or to some other destination. On the other hand, if the call was directed initially to the Agent DN or to the Phone DN at the agent's workstation, then actuating the call drop button 709 could be configured to result in the call being disconnected.

Figure 2:
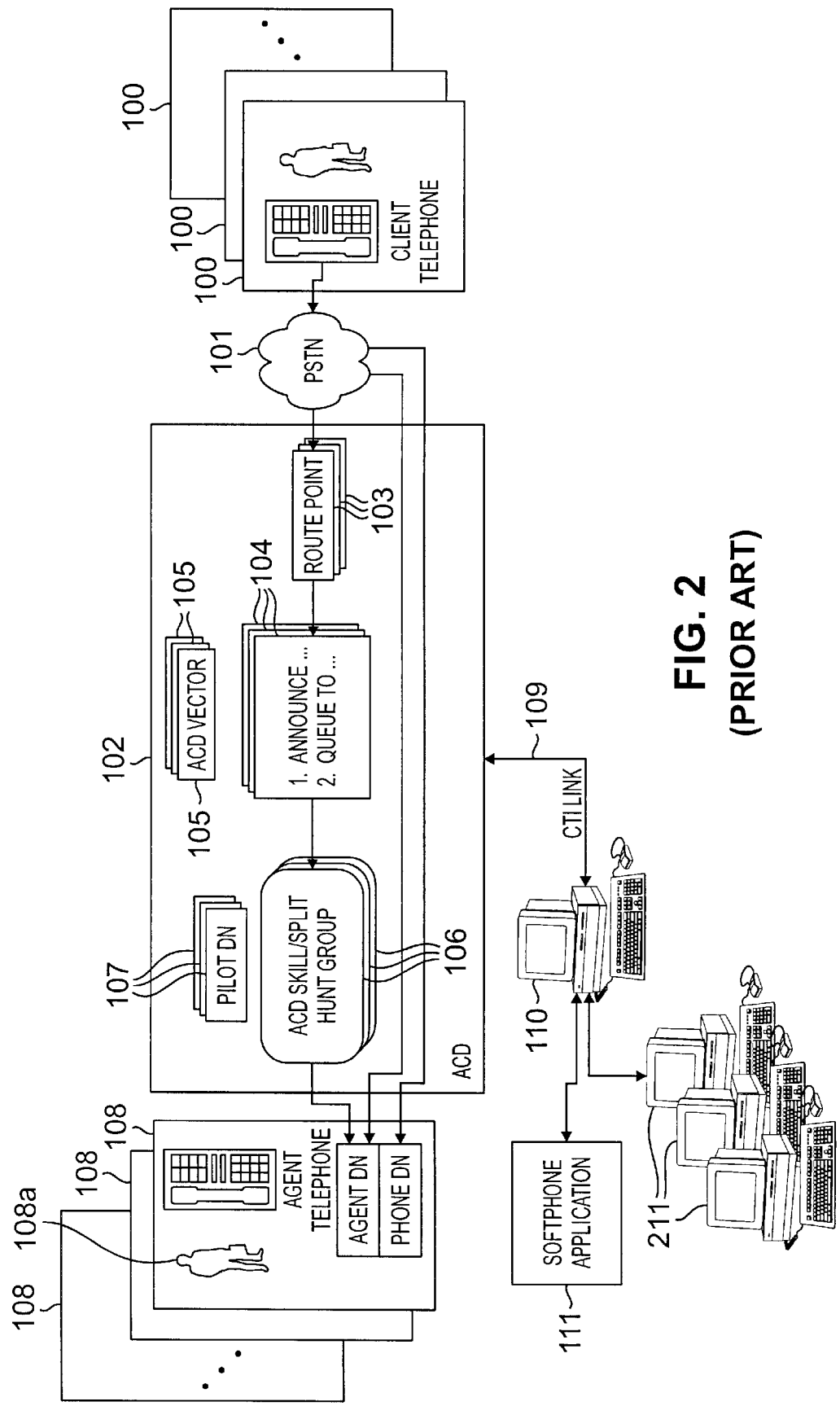
FIG. 2 illustrates a conventional call center having a robotic call processing application

The embodiments of the invention discussed thus far have shown a Softphone application 111 having an associated GUI with which a human agent interacts to perform the various capabilities described. As previously discussed, embodiments of the invention are also applicable to robotic call processing applications associated with a route point. For example, the robot application 212 shown in FIG. 2 is associated with the route point 103.

Figure 8:
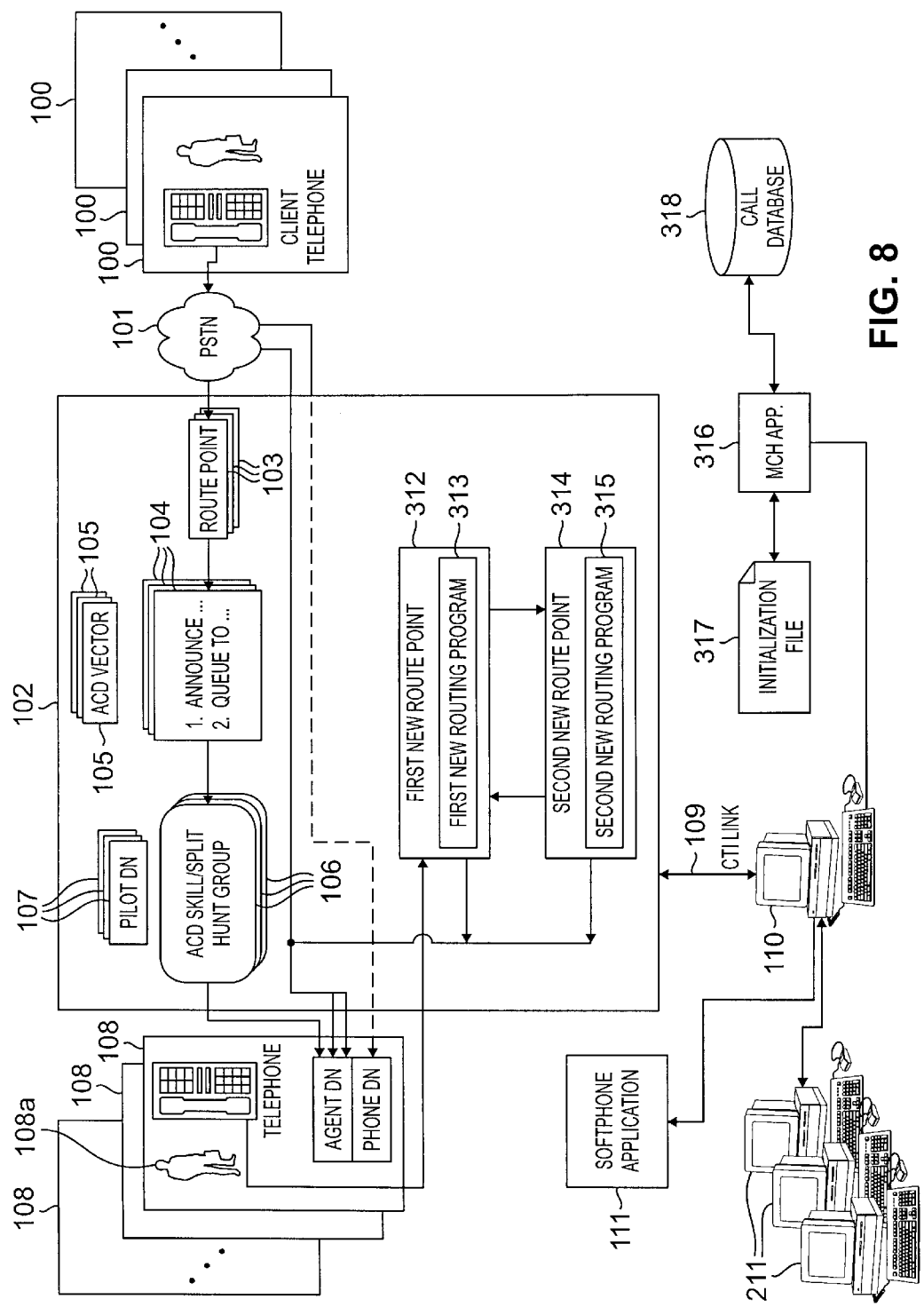
FIG. 8 illustrates an embodiment of the invention in which a robotic call processing application may also direct calls to be queued in the new route points.

FIG. 8 illustrates an embodiment of the invention in which the robotic application 211 interacts with the previously described components of the present invention in a manner similar to that of the agent 108*a* and the Softphone application 111. In this embodiment, the commands previously described as arriving at the MCH application 316 from the Softphone application 111 are replaced with commands arriving from the robotic application 211. These commands would typically arrive at the MCH application 316 via the CTI link 109. Likewise, when the robotic application 211 needs to retrieve a parked call from one of the new route points, the robotic application 211 sends a command to the MCH application 316 similar to that sent by the Softphone application 111 when retrieval of a parked call is desired. In all other respects, this alternative embodiment functions in a similar manner to the previously described embodiments of the invention. Moreover, the present invention may provide multiple call handling services for both robotic call processing applications and agent workstations at the same time, as the configurations are not mutually exclusive.

Figure 9:
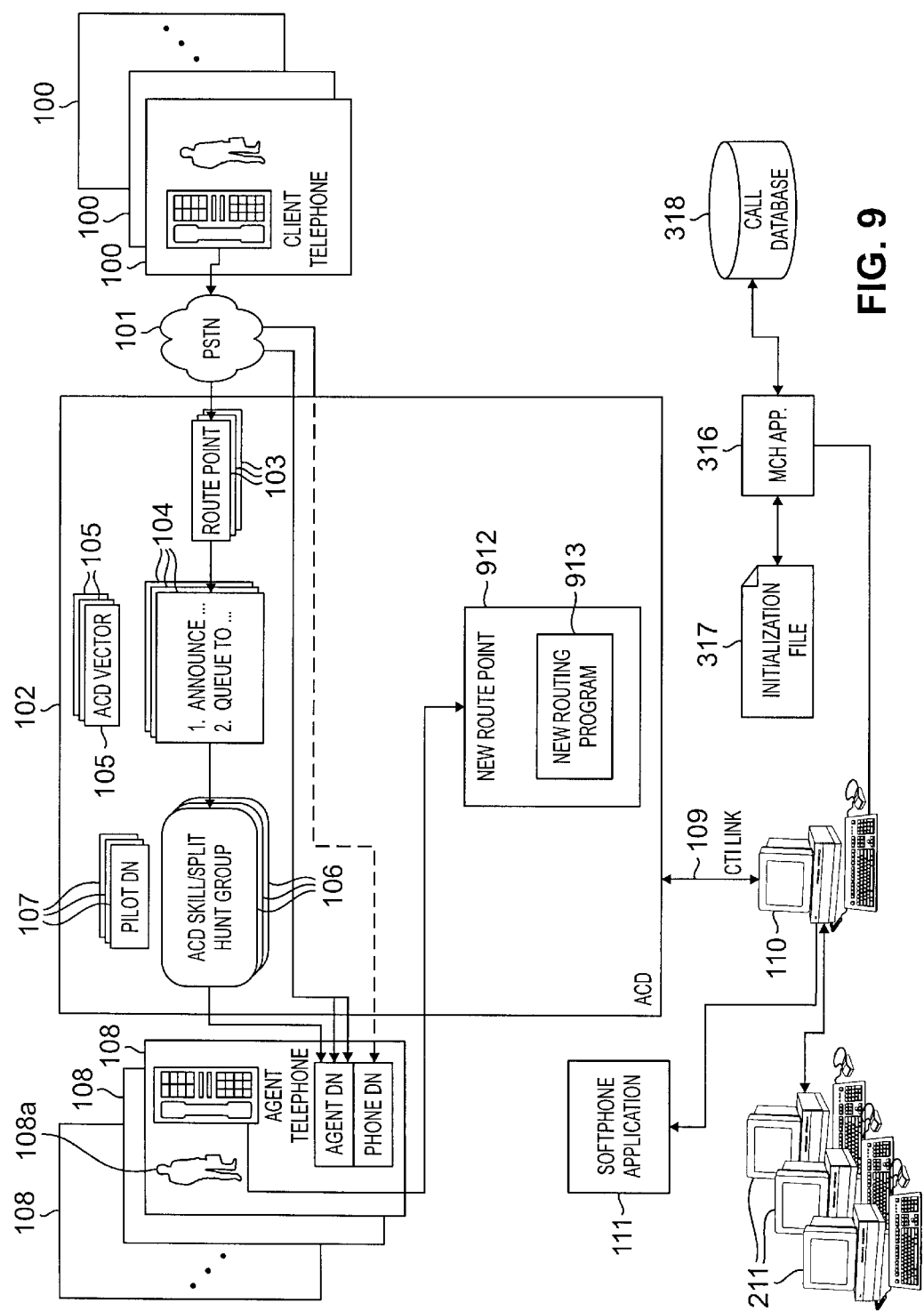
FIG. 9 illustrates one alternative embodiment of the present invention.

FIG. 9 illustrates an alternative embodiment of the invention. In this alternative embodiment, the ACD 102 does not have a default timeout routing period. Accordingly, a second new route point is no longer needed. As shown in FIG. 9, a call queuing capability is provided by a single new route point 912 having a routing program 913. Calls may be queued in the new route point 912 by sending appropriate commands through the CTI link 109 from the MCH application 316.

In this alternative embodiment, the new routing program 913 may contain a default routing instruction which will occur after a configurable period of time. Providing a default routing period allows the new route point 912 to be emptied of queued calls should an error occur in the MCH application 316. As discussed above, the default timeout period for the ACD 102 provides a mechanism for emptying a route point should an error occur in the MCH application 316. The new route point 912 could contain an instruction to default route queued calls after a time period that equals the maximum timeout period that was previously discussed with respect to the MCH application 316. This approach would allow the queued calls to be emptied from the new route point 912 in the event of a failure of the MCH application 316. In all other significant respects this alternative embodiment functions in the same manner as the previously discussed embodiment.

Figure 10:
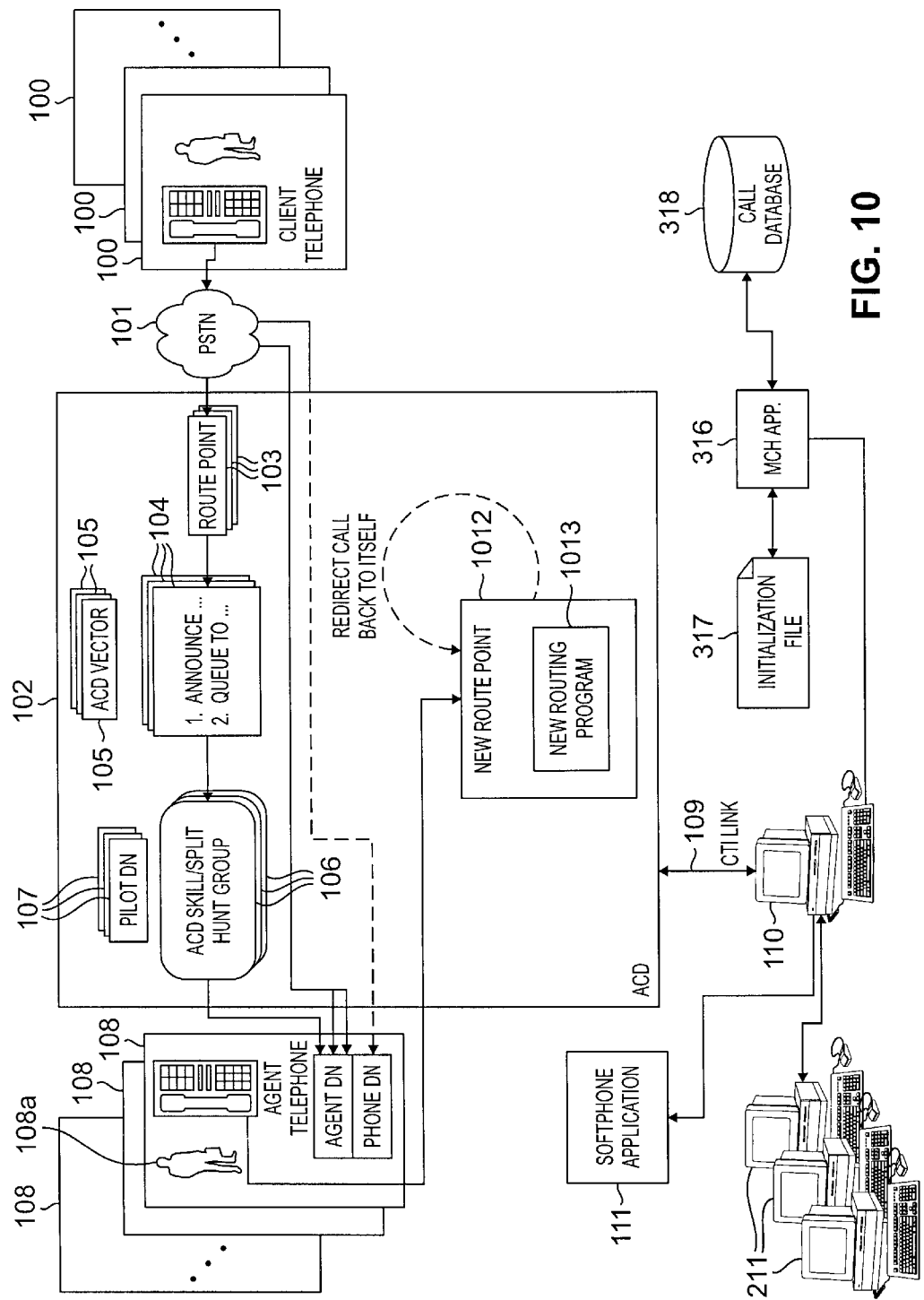
FIG. 10 illustrates yet another alternative embodiment of the present invention.

FIG. 10 illustrates yet another alternative embodiment of the present invention. In this embodiment of the invention, the ACD 102 contains no prohibitions which prevent a call from being redirected to the same route point from which it came. In other words, the ACD 102 allows a call to be rerouted to itself. As shown in FIG. 10, the ACD 102 is modified to include a new route point 1012 and a new routing program 1013. The MCH application 316 sends a redirect command to the new route point 1012 in a time period less than that of the default timeout period for the ACD 102. The redirect command transfers a queued call in the new route point 1012 back to the new route point 1012, effectively starting the default routing period for this call over again. In all other aspects this embodiment functions in an identical manner to the previously described embodiments.

From the foregoing it will be appreciated that, although specific embodiments of the invention have been described herein for purposes of illustration, various modifications may be made without deviating from the spirit and scope of the invention. Accordingly, the invention is not limited except as by the appended claims.

While the present invention has been described with reference to preferred embodiments thereof, those skilled in the art will appreciate that various changes in form and detail may be made without departing from the intended scope of the present invention as defined in the appended claims. For example, the MCH application, the robotic call processing application, and the route points may differ from those shown in the figures or additional route points might be provided to support various additional functions such as playing a specific audible message to the user. Also, the Softphone application in addition to being interacted with by a human may also be interacted with by a robotic application. Moreover, the MCH application and the robotic call processing application may be run on different types of computing systems or on computing systems differing substantially from the computing network discussed herein. The MCH application and the robotic call processing application may each be provided in microcode in a hardware device in communication with the ACD, such as that provided on a computer chip or an application specific integrated circuit (ASIC).

In one exemplary alternative embodiment, the new route points, as well as the MCH application and the call database, may be provided as a plug-in device to the ACD. In this embodiment, a utility program could be run in the ACD maintenance console to appropriately configure the ACD for operations with the plug-in device. Such a device would operate in all significant respects in the same manner as the embodiment described herein.

In another embodiment of the invention, the MCH application may be merged into the Softphone application 111. In this embodiment, the Softphone application 111 would send multiple call handling commands through the CTI link, such as the command to queue a call by performing a blind transfer to the new route point.

Although specific embodiments of, and examples for, the invention are described herein for illustrative purposes, various equivalent modifications are possible within the scope of the invention, as will be recognized by those skilled in the relevant art. The teachings provided herein of the invention can be applied to other multiple call handling systems, not necessarily the exemplary multiple call handling system described above. Various exemplary computing systems, and accordingly, various other system configurations can be employed under the invention.

The embodiments of the invention disclosed herein have been discussed with regard to call center installations, such as those using large computing systems. However, the invention finds equal applicability in other computing systems, such as small, portable computerized systems and even de-centralized computing devices distributed in a network.

These and other changes can be made to the invention in light of the above detailed description. In general, in the following claims, the terms used should not be construed to limit the invention to the specific embodiments disclosed in the specification and the claims, but should be construed to include all distributed resource allocation systems that operate under the claims. Accordingly, the invention is not limited by the disclosure, but instead its scope is to be determined by the following claims.

What is claimed is:

1. In a call center having an automatic call distributor (ACD) for routing directed calls and a plurality of call-receiving devices, the improvement comprising:
    creating a first route point in the call center devoid of a queue statement that would direct calls routed to the first route point away from the first route point, so that the ACD loses control over distributing of the calls that are routed to the first route point for at least a first period of time;
    in response to a first request from a device of the call-receiving devices to which a call has been routed, firstly directing the call from the call-receiving device to which the call has been routed to the route point;
    in response to the firstly directing, the ACD routing the call to the first route point;
    in response to a second request from a device of the call-receiving devices during at least the first period of time, secondly directing the call from the first route point to a device of the call-receiving devices; and
    in response to the secondly directing, the ACD routing the call to the call-receiving device to which the call is directed.

2. The improvement of claim 1 wherein:
    after the first period of time, the ACD regains control over distributing of the calls that are routed to the first route point;
    the improvement further comprising
        before expiration of the first period of time, thirdly directing calls that are routed to the first route point to one of (a) the first route point and (b) a second route point that directs calls that are routed to the second route point to the first route point; and
        in response to the thirdly directing, the ACD routing the calls from the first route point to the one of (a) the first route point and (b) the second route point.

3. The improvement of claim 1 in a call center wherein the ACD gains control over distributing of the calls that are routed to the first route point to the call-receiving devices after the first period of time.

4. The improvement of claim 1 wherein:
    the first request is a request from a first device;
    the second request is a request from one of (c) the first device and a second device different from the first device; and
    secondly directing comprises directing the call to one of (d) the first device, (e) the second device, and (f) a third device different from the first and the second devices.

5. The improvement of claim 1 wherein:
    the first request is one of a call-hold and a call-park request; and
    the second request is one of a call-pickup and a call-transfer request.

6. In a call center having an automatic call distributor (ACD) for routing directed calls and a plurality of call-receiving devices, the improvement comprising:
    a first route point in the call center devoid of a queue statement that would direct calls routed to the first route point away from the first route point, so that the ACD loses control over distributing of the calls that are routed to the first route point for at least a first period of time;
    a first control entity that responds to a first request from a device of the call-receiving devices to which a call has been routed by directing the call from the call-receiving device to which the call has been routed to the route point to cause the ACD to route the call to the first route point, and that responds during at least the first period of time to a second request from a device of the call-receiving devices by directing the call from the first route point to a device of the call-receiving devices to cause the ACD to route the call to the device to which the call is directed.

7. The improvement of claim 6 wherein:
    after the first period of time the ACD regains control over distributing of the calls that are routed to the first route point;
    the improvement further comprising
        a second control entity that, before expiration of the first period of time, directs calls that are routed to the first route point to one of (a) the first route point and (b) a second route point that directs calls that are routed to the second route point to the first route point, to cause the ACD to route the calls to the one of (a) the first route point and (b) the second route point.

8. The improvement of claim 6 in a call center wherein the ACD gains control over distributing of the calls that are routed to the first route point to the call-receiving devices after the first period of time.

9. The improvement of claim 6 wherein:
    the first request is a request from a first device;
    the second request is a request from one of (c) the first device and a second device different from the first device; and
    the first control entity responds to the second request by directing the call to one of (d) the first device, (e) the second device, and (f) a third device different from the first ad the second devices.

10. The improvement of claim 6 wherein:
    the first request is one of a call-hold and a call-park request; and the second request is one of a call-pickup and a call-transfer request.

11. In a call center having an automatic call distributor (ACD) for routing directed calls and a plurality of call-receiving devices, the improvement comprising:
    creating a first route point in the call center that retains calls routed to the first route point for a predetermined time period so that the ACD lacks an ability to distribute the calls for the predetermined time period;
    before expiration of the predetermined time period, firstly directing calls that are routed to the first route point to one of (a) the first route point and (b) a second route point that directs calls that are routed to the second route point to the first route point;
    in response to the firstly directing, the ACD routing the calls from the first route point to the one of (a) the first route point and (b) the second route point;
    in response to a first request from a device of the call-receiving devices to which the call has been routed, secondly directing the call from the call-receiving device to the first route point;
    in response to the secondly directing, the ACD routing the call to the first route point;
    in response to a second request from a device of the call-receiving devices, thirdly directing the call from the first route point to a device of the call-receiving devices; and in response to the thirdly directing, the ACD routing the call to the call-receiving device to which the call is directed.

12. The improvement of claim 11 further comprising:
creating the second route point;
wherein the firstly directing comprises
in response to an individual call being routed to the first route point, substantially immediately directing the individual call to the second route point; and
directing the individual call that has been routed to the second route point back to the first route point before expiration of the predetermined time period.

13. The improvement of claim 11 wherein:
the first route point is devoid of a queue statement directing calls routed to the first route point away from the first route point before expiration of the predetermined time period, so that the ACD loses control for the predetermined time period over distributing of the calls that are routed to the first route point.

14. The improvement of claim 13 further comprising:
creating the second route point, the second route point having a queue statement directing calls routed to the second route point to the first route point before expiration of the predetermined time period.

15. The improvement of claim 11 for queuing telephone calls in a telephone call center operated by a plurality of agents, the call center having a database and the automatic call distributor (ACD) connected to a computer-telephony integration (CTI) link and connected to the plurality of call-receiving devices comprising a plurality of agent workstations for the plurality of agents, wherein each agent workstation comprises a telephone and a Softphone application that communicates with the ACD through the CTI link, further comprising:
providing a user interface in the Softphone application, the user interface being capable of receiving call queuing instructions from the plurality of agents; and
for each call queuing instruction received by the Softphone application for a call at an agent workstation to be queued:
receiving identification information from the agent workstation, including an identification for the call to be queued;
creating a call index number for the call to be queued;
tagging the call with the call index number;
sending an instruction through the CTI link to transfer the call from the telephone at the agent workstation to the first route point; and
storing call information in the database, including the identification information from the agent workstation and the call index number of the queued call.

16. The improvement of claim 15 wherein the predetermined time period comprises a default routing timeout of the ACD, further comprising:
creating the second route point in the call center, the second route point having an ability to retain a call transferred to it; wherein
the ACD routing the calls from the first route point comprises
transferring the queued call from the first route point to the second route point at a time prior to the expiration of the default routing timeout for the queued call retained in the first route point.

17. The improvement of claim 16, further comprising:
transferring the queued call back from the second route point to the first route point at a time prior to the expiration of the default routing timeout for the queued.

18. The improvement of claim 16, wherein the second route point is created within the maintenance console of the ACD.

19. The improvement of claim 16, further comprising transferring the queued call back and forth between the first route point and the second route point at times prior to the expiration of the default routing timeout for the queued call until the queued call is returned to the telephone at the agent workstation.

20. The improvement of claim 15, further comprising setting a timer for a time less than the default routing timeout for the queued call retrieved in the first route point to initiate the transferring of the queued call.

21. The improvement of claim 15 for use with the ACD having a default number of unassigned calls, further comprising:
redirecting calls from the first route point to the second route point in an amount of time that increases a number of unassigned calls beyond the default number of unassigned calls for the ACD.

22. The improvement of claim 1, wherein:
thirdly directing comprises
receiving a queued call retrieval instruction from the user interface, the queued call retrieval instruction including the identification information from the agent workstation;
retrieving information about the queued call from the database to formulate a call retrieval instruction; and
sending the call retrieval instruction through the CTI link to transfer the queued call from the first route point to the telephone at the agent workstation.

23. The improvement of claim 22, wherein the queued call is retrieved selectively, regardless of a queue position of the queued call relative to other queued calls in the first route point.

24. The improvement of claim 15 wherein the queued call resides in one of the first route point or the second route point, wherein:
thirdly directing comprises
receiving a queued call retrieval instruction from the user interface, the queued call retrieval instruction including identification information for a queued call;
retrieving information about the queued call from the database, including a present location for the queued call, wherein the present location is one of the first route point or the second route point, to formulate a call de-queue instruction; and
sending the call de-queue instruction through the CTI link to transfer the queued call from the present location to the telephone at the agent workstation for which the call was queued.

25. The improvement of claim 15 wherein the ACD is a Private Branch Exchange (PBX).

26. The improvement of claim 15 wherein instructions sent through the CTI link to the ACD are formatted for one of a Lucent® Definity G3 ACD or a Northern Telecom Meridian ACD.

27. The improvement of claim 15 wherein instructions sent through the CTI link to the ACD are formatted for CTI Middleware.

28. The improvement of claim 15 wherein the CTI Middleware is one of IBM Callpath, Genesys T-Server, or Dialogic CT-Connect.

29. The improvement of claim 15, further comprising:
receiving an instruction to drop the queued call from the first route point; and dropping the queued call from the first route point in response thereto by sending a queued call drop instruction through the CTI link to the first route point.

30. The improvement of claim 15 wherein the first route point is created within the maintenance console of the ACD.

31. The improvement of claim 15 wherein, if the identification information is insufficient to perform the call queuing instruction, then generating and sending an error message to the Softphone application.

32. The improvement of claim 15, further comprising performing error diagnostics to determine that call queuing operations are performed within expected parameters.

33. The improvement of claim 15 wherein: if a caller of the queued call disconnects from the queued call, then sending a disconnect message to the Softphone application and updating the call information in the database to reflect the queued call disconnect.

34. The improvement of claim 15, further comprising providing the Softphone application with a list of queued calls.

35. The improvement of claim 15, further comprising transferring the queued call out of the first route point if the queued call is retained in the first route point for a maximum call queuing time.

36. The improvement of claim 15 wherein the call index number is a unique call index number with respect to all queued calls in the database.

37. The improvement of claim 11 for providing multiple call queuing in the call center, further comprising:
receiving instructions to queue calls for the plurality of call receiving devices;
uniquely identifying each call to be queued; and
queuing each uniquely identified call by transferring the call to be queued from a call receiving device of the plurality of call receiving devices to the first route point.

38. The improvement of claim 37 wherein:
the ACD routing in response to the thirdly directing comprises
receiving a request for a uniquely identified queued call;
retrieving the uniquely identified queued call from the first route point; and
transferring the retrieved call to a call receiving device of the plurality of call receiving devices from which the retrieved call was queued.

39. The improvement of claim 38 wherein the queued call is selectively retrieved with respect to other calls in the first route point without regard for the order in which queued calls have been queued.

40. The improvement of claim 37 wherein the ACD has a default number of unassigned calls, further comprising redirecting calls from the first route point to the second route point in an amount of time that increases a number of unassigned calls beyond the default number of unassigned calls for the ACD.

41. The improvement of claim 37 wherein the queued call is selectively dropped from the first route point.

42. The improvement of claim 37, further comprising:
creating the second route point in the call center; and
the ACD routing the calls in response to the firstly directing comprises
transferring each queued call from the first route point to the second route point at a time prior to the expiration of a default routing timeout for each queued call retained in the first route point.

43. The improvement of claim 41, further comprising:
transferring the queued call back to the first route point from the second route point at a time prior to the expiration of the default routing timeout for each queued call retained in the second route point.

44. The improvement of claim 37, further comprising re-queuing each queued call back into the first route point from the first route point at a time prior to the expiration of the default routing timeout for each queued call.

45. The improvement of claim 37 wherein:
thirdly directing comprises
receiving a queued call retrieval instruction for a queued call that includes a specified call receiving device; and
retrieving information about the queued call and using the retrieved information to form a de-queue command; and
the ACD routing the call in response to the thirdly directing comprises
transferring the queued call from the first route point to the call receiving device specified in the queued call retrieval instruction using the de-queue command.

46. The method of claim 37 wherein the queued call may reside in the first route point or the second route point, wherein:
thirdly directing comprises
receiving a queued call retrieval instruction for a queued call that includes a specified call receiving device; and
receiving information about the queued call, including its location, and using the retrieved information to form a de-queue command; and
the ACD routing the call in response to the thirdly directing comprises
transferring the queued call from its indicated location in one of the first route point or the second route point to the call receiving device specified in the queued call retrieval instruction using the de-queue command.

47. The improvement of claim 37 wherein the call-receiving device is a telephone.

48. The improvement of claim 37 wherein the call-receiving device is a robotic call processing application.

49. A computer-readable medium containing instructions for directing a computer to perform the method of claim 11 for a telephone at an agent workstation in a call center further equipped with a computer-telephony integration (CTI) link, further comprising:
receiving identification information for a call to be queued from the telephone at the agent workstation;
creating a call index number for the call;
tagging the call with the call index number; and
sending an instruction having the call index number through the CTI link to transfer the call from the telephone to the first route point.

50. The computer-readable medium of claim 49 wherein the call center has a database that stores call information for queued calls, including the identification information for the call and the call index number for the call.

51. The computer-readable medium medium of claim 49 wherein the call center has a second route point, and further comprising:
transferring the queued call from the first route point to the second route point at a time prior to the expiration of a default timeout routing period for the queued call retained in the first route point.

52. The computer-readable medium of claim 51, further comprising:

transferring the queued call back to the first route point from the second route point prior to the expiration of the default timeout routing period for the queued call in the second route point.

53. The computer-readable medium of claim 49 wherein the ACD has a default number of unassigned calls, further comprising redirecting calls from the first route point to a second route point in an amount of time that increases a number of unassigned calls beyond the default number of unassigned calls for the ACD.

54. The computer-readable medium of claim 49, further comprising:

re-queuing the queued call back to the first route point from the first route point at a time prior to the expiration of a default timeout routing period for the ACD.

55. The computer-readable medium of claim 50, further comprising:

receiving a queued call retrieval instruction for the queued call that includes a specified telephone;

retrieving information about the queued call from the database and using the retrieved information to form a de-queue command; and transferring the queued call from the first route point to the specified telephone using the de-queue command.

56. The computer-readable medium of claim 50 wherein the queued call may reside in the first route point or a second route point, further comprising the steps of:

receiving a queued call retrieval instruction for a queued call that includes a specified telephone;

retrieving information about the queued call from the database, including a present location for the queued call, wherein the present location is one of the first route point or the second route point and using the retrieved information to form a de-queue command; and transferring the queued call from the present location to the specified telephone using the de-queue command.

57. The computer-readable medium of claim 49 wherein the ACD is a Private Branch Exchange (PBX) and wherein instructions sent through the CTI link are formatted for the PBX.

58. The computer-readable medium of claim 47, further comprising selectively retrieving the queued call and transferring the queued call to the telephone from which the call was queued.

59. The improvement of claim 11 for selectively parking calls and selectively retrieving calls in the call center, wherein:

the ACD routing the call in response to the secondly directing comprises transferring a call from a call receiving device of the plurality of call receiving devices to the first route point using a Softphone application which is associated with said call receiving device of the plurality of call receiving devices; and the improvement further comprising retaining an index for the queued call; and storing call queuing data in a database, wherein the call queuing data includes call identification information and the call index.

60. The improvement of claim 59 wherein the call center has the second route point; and the ACD routing the calls in response to the firstly directing comprises transferring the queued call from the first route point to the second route point at a time prior to the expiration of a default timeout routing period for the queued call retained in the first route point.

61. The improvement of claim 60, further comprising:

transferring the call from the second route point back to the first route point at a time prior to the expiration of the default timeout routing period for the queued call retained in the second route point.

62. The improvement of claim 59, further comprising:

re-queuing the queued call back into the first route point from the first route point at a time prior to the expiration of a default timeout routing period for the ACD.

63. The improvement of claim 59 wherein the ACD has a default number of unassigned calls, wherein finally directing comprises redirecting calls from the first route point to the second route point in an amount of time that increases a number of unassigned calls beyond the default number of unassigned calls for the ACD.

64. The improvement of claim 59 wherein:

secondly directing comprises receiving a queued call retrieval instruction for the queued call that includes a specified call receiving device; and retrieving information about the queued call from the database and using the retrieved information to form a de-queue command; and the ACD routing the call in response to the secondly directing comprises transferring the queued call from the first route point to the specified call receiving device using the de-queue command.

65. The improvement of claim 59 wherein:

the queued call may reside in the first route point or in the second route point;

the secondly directing comprises receiving a queued call retrieval instruction for the queued call that includes a specified call receiving device;

retrieving information about the queued call from the database, including a present location for the queued call, wherein the present location is one of the first route point or the second route point; and using the retrieved information to form a de-queue command; and the ACD routing the call in response to the secondly directing comprises transferring the queued call from the present location to the specified call receiving device using the de-queue command.

66. The improvement of claim 59 wherein the ACD is a Private Branch Exchange (PBX).

67. The improvement of claim 59 wherein the call-receiving device is a telephone.

68. The improvement of claim 59 wherein the call-receiving device is a robotic call-processing application.

69. The improvement of claim 11 for providing multiple call queuing in the call center further having a plurality of route points that are associated with a plurality of robotic applications, wherein:

secondly directing comprises receiving instructions to queue calls on the plurality of robotic applications; and uniquely identifying each call to be queued; and the ACD routing the call in response to the secondly directing comprises queuing each uniquely identified call by transferring the call to be queued from a routing point of the plurality of routing points associated with the plurality of robotic applications to the first route point.

70. The improvement of claim 69 wherein:
thirdly directing comprises
  receiving a request for a uniquely identified queued call; and
  the ACD routing the call in response to the thirdly directing comprises
    retrieving the uniquely identified queued call from the first route point; and
    transferring the retrieved call to a destination as directed by the robotic application from which the retrieved call was queued.

71. The improvement of claim 69 wherein the queued call is selectively retrieved with respect to other calls in the first route point.

72. The improvement of claim 69 wherein the ACD has a default number of unassigned calls, and wherein firstly directing comprises redirecting calls from the first route point to the second route point in an amount of time that increases a number of unassigned calls beyond the default number of unassigned calls for the ACD.

73. The improvement of claim 69 wherein the queued call is dropped from the first route point.

74. The improvement of claim 69, further comprising:
creating the second route point in the call center; and
the ACD routing the calls in response to the firstly directing comprises
  transferring each queued call from the first route point to the second route point at a time prior to the expiration of a default routing timeout for each queued call retained in the first route point.

75. The improvement of claim 74, further comprising:
transferring the queued call back to the first route point from the second route point at a time prior to the expiration of the default routing timeout for each queued call retained in the second route point.

76. The improvement of claim 69, further comprising
re-queuing the queued call back into the first route point from the first route point at a time prior to the expiration of the default routing timeout for each queued call.

77. The improvement of claim 69 wherein:
thirdly directing comprises
  receiving a queued call retrieval instruction for a queued call; and
  retrieving information about the queued call and using the retrieved information to form a de-queue command; and
  the ACD routing the call in response to the thirdly directing comprises
    transferring the queued call from the first route point to a destination as directed by the robotic application using the de-queue command.

78. The improvement of claim 69 wherein:
the queued call may reside in the first route point or in the second route point;
thirdly directing comprises
  receiving a queued call retrieval instruction for a queued call; and
  receiving information about the queued call, including its location, and using the retrieved information to form a de-queue command; and
  the ACD routing the call in response to the thirdly directing comprises
    transferring the queued call from one of the first route point or the second route point to a destination as directed by the robotic application from which the call was queued using the de-queue command.

79. A computer readable storage medium containing instructions to perform the steps of claim 15.

80. A computer readable storage medium containing instructions to perform the steps of claim 37.

81. A computer readable storage medium containing instructions to perform the steps of claim 59.

82. A computer readable storage medium containing instructions to perform the steps of claim 69.

83. In a call center having an automatic call distributor (ACD) for routing directed calls and a plurality of call-receiving devices, the improvement comprising:
a first route point in the call center that retains calls routed to the first route point for a predetermined time period, so that the ACD lacks an ability to distribute the calls for the predetermined time period;
a first control entity that, before expiration of the predetermined time period, directs calls that are routed to the first route point to one of (a) the first route point and (b) a second route point that directs calls that are routed to the second route point to the first route point; and
a second control entity that responds to a first request from a device of the call-receiving devices to which a call has been routed by directing the call from the call receiving device to the first route point to cause the ACD to route the call to the first route point, and that responds to a second request from a device of the call-receiving devices by directing the call from the first route point to a device of the call receiving devices to cause the ACD to route the call to the device to which the call is directed.

84. The improvement of claim 83 further comprising:
the second route point; wherein
  the first control entity responds to an individual call being routed to the first route point by substantially immediately directing the individual call to the second route point; and
  the second route point directs the individual call that has been routed to the second route point back to the first route point before expiration of the predetermined time period.

85. The improvement of claim 83 wherein:
the first route point is devoid of a queue statement that would direct calls routed to the first route point away from the first route point before expiration of the predetermined time period, so that the ACD loses control for the predetermined time period over distributing of the calls that are routed to the first route point.

86. The improvement of claim 85 wherein:
the second route point has a queue statement directing calls routed to the second route point to the first route point before expiration of the predetermined time period.

87. The improvement of claim 83 for queuing telephone calls in a call center having a plurality of telephones, the automatic call distributor (ACD) connected to the plurality of telephones, and a computer-telephone integration (CTI) link that transfers communications between the ACD and external computing applications, further comprising:
a Softphone application that receives instructions for queuing calls for the plurality of telephones;
a multiple call handling (MCH) application that functions as one of the external computer applications and that receives call queuing commands from the Softphone application and sends instructions to the ACD, using the CTI link, to queue calls by transferring a call from a telephone of the plurality of telephones to the first new route point; and a database that receives call queuing data for queued calls from the MCH application.

88. The improvement of claim 87 wherein the Softphone application receives instructions for de-queuing calls and the MCH application retrieves call queuing data from the database to formulate an instruction the ACD, using the CTI link, that de-queues a queued call by redirecting the queued call from the first route point back to the telephone of the plurality of telephones from which the queued call was received.

89. The improvement of claim 87 wherein the call center has the second route point, and wherein the first control entity comprises the MCH application which uses the CTI link to command the first route point to redirect the queued call from the first route point to the second route point before the ACD default routing timeout period for unassigned calls expires for the queued call.

90. The improvement of claim 89 wherein the second route point causes the ACD to transfer a queued call from the second route point to the first route point before the ACD default routing timeout period for unassigned calls expires for the queued call.

91. The improvement of claim 87 wherein the first control entity comprises the MCH application which redirects calls from the first route point to the second route point in an amount of time that increases a number of unassigned calls beyond a default number of unassigned calls for the ACD.

92. The improvement of claim 87 wherein the call center has the second route point, and wherein the first control entity comprises the MCH application which transfers queued calls back and forth between the first route point and the second route point at times prior to the expiration of an ACD default routing timeout period for each queued call.

93. The improvement of claim 87 wherein the ACD is a Private Branch Exchange (PBX) and wherein the MCH application sends instructions through the CTI link in a format suitable for the PBX.

94. The improvement of claim 87 wherein instructions sent from the MCH application through the CTI link are formatted for one of a Lucent® Definity G3 ACD, or a Northern Telecom Meridian ACD.

95. The improvement of claim 87 herein the instructions sent from the MCH application through the CTI link are formatted for CTI Middleware.

96. The improvement of claim 87 wherein the MCH application retrieves queued calls selectively, regardless of their order in the first route point.

97. The improvement of claim 87 wherein the MCH application performs a selective call drop function that transfers a queued call from the first route point to a call center route point controlled by the ACD.

98. The improvement of claim 87 wherein a call-receiving device comprises:

call center agent workstation having a multiple call handling feature;

a plain old telephone set (POTS); and a Softphone application that receives call queuing instructions for calls on the POTS and uses the call queuing instructions to send call queuing commands to the ACD to queue calls on the POTS.

99. The improvement of claim 98 wherein the Softphone application receives call pickup instructions for calls queued from the POTS and sends call pickup commands to the ACD to transfer queued calls back to the POTS.

100. The improvement of claim 98 wherein the call queuing commands include a call identifier for a call to be queued and agent workstation identification data.

101. The improvement of claim 99 wherein the call pickup commands include a call identifier for a call to be retrieved and agent workstation identification data for the agent workstation associated with the POTS.

102. The improvement of claim 98 wherein the second control entity comprises a multiple call handling (MCH) application and a computer-telephony integration (CTI) link, and wherein the call queuing commands from the Softphone application are received by the MCH application which formats the call queuing commands into a format suitable for transmission over the CTI link to the ACD.

103. The improvement of claim 102 wherein the second control entity further comprises a database that retains queued call data for the queued calls and provides the queued call data to the MCH application.

104. The improvement of claim 103 wherein the MCH application uses queued call data to locate a queued call and transfer the queued call to the POTS in response to a retrieve call request from the Softphone application.

105. The improvement of claim 104 wherein the Softphone application commands retrieval of queued calls selectively, regardless of the order in which queued calls have been queued.

106. The improvement of claim 83 for multiple call handling in a the call center further having a computer-telephony integration (CTI) link attached to the ACD, and the plurality of call-receiving devices connected to the ACD, wherein:

the second call-control entity comprises a multiple call handling (MCH) application that receives queued call requests, creates a call index for each call to be queued, and causes transfer of each call to be queued from one of the call receiving devices of the plurality of call receiving devices to the first route point by sending a command over the CTI link to the ACD, wherein the command includes the call index; and a database that stores call queuing data for the multiple call handling application, wherein the call queuing data includes the call index.

107. The improvement of claim 106 wherein the plurality of call handling devices comprise a plurality of telephones, and further comprising a Softphone application that receives call queuing requests for queuing calls on the plurality of telephones and sends the queued call requests to the MCH application.

108. The improvement of claim 106 wherein the call center has the second route point, and wherein the MCH application causes the queued call to be transferred from the first route point to the second route point at a time prior to the expiration of a default timeout routing period for the ACD for the queued call retained in the first route point.

109. The improvement of claim 108 wherein the MCH application receives status information that the queued call has been transferred from the second new route point back to the first new route point and stores the status information in the database.

110. The improvement of claim 106 wherein the plurality of call-handling devices are robotic call-processing applications.

111. The improvement of claim 37, wherein the ACD has a predefined set of call queuing commands, and wherein the Softphone application is operable to receive instructions for queuing calls which are not contained in the predefined set of call queuing commands.

112. The improvement of claim 37, wherein the ACD has a predefined set of call queuing commands, and wherein the Softphone application is operable to receive call queuing instructions which are not contained in the predefined set of call queuing commands.

* * * * *